(12) United States Patent
Ma et al.

(10) Patent No.: US 11,147,061 B2
(45) Date of Patent: Oct. 12, 2021

(54) DATA RECEIVING METHOD, RELATED DEVICE, AND SYSTEM

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 16/713,698

(22) Filed: Dec. 13, 2019

(65) Prior Publication Data

US 2020/0120655 A1 Apr. 16, 2020

Related U.S. Application Data

(63) Continuation of application No. PCT/CN2018/090831, filed on Jun. 12, 2018.

(30) Foreign Application Priority Data

Jun. 16, 2017 (CN) .......................... 201710459167.8

(51) Int. Cl.
*H04W 72/04* (2009.01)

(52) U.S. Cl.
CPC ....... *H04W 72/044* (2013.01); *H04W 72/042* (2013.01)

(58) Field of Classification Search
CPC ............. H04W 72/042; H04W 72/044; H04W 72/1289; H04L 5/0062; H04L 5/0053; H04L 5/0094

See application file for complete search history.

(56) References Cited

U.S. PATENT DOCUMENTS

2018/0227777 A1* 8/2018 Sun .................. H04W 52/0212
2020/0029312 A1* 1/2020 Falahati ............ H04W 72/0446

FOREIGN PATENT DOCUMENTS

| CN | 103120010 A | 5/2013 |
| CN | 103260241 A | 8/2013 |
| WO | 2016099196 A1 | 6/2016 |

OTHER PUBLICATIONS

Samsung,"Multiplexing NR-PDCCH and PDSCH", 3GPP TSG RAN WG1 Meeting #89, R1-1707993, May 15-19, 2017, 5 pages, Hangzhou, China.

(Continued)

*Primary Examiner* — Maharishi V Khirodhar
*Assistant Examiner* — Kenneth P Hunt
(74) *Attorney, Agent, or Firm* — Slater Matsil, LLP

(57) ABSTRACT

In a data receiving method, a terminal receives first indication information, where the first indication information indicates a target frequency domain position. The terminal determines a first time-frequency resource based on a time domain position of a control resource set and the target frequency domain position, where a frequency domain position of the first time-frequency resource is the same as the target frequency domain position. The terminal receives data on a target time-frequency resource, where the target time-frequency resource includes a second time-frequency resource and a part of resources in the first time-frequency resource; or the target time-frequency resource includes a second time-frequency resource but does not include the first time-frequency resource, where N is a positive integer.

19 Claims, 20 Drawing Sheets

(56) References Cited

OTHER PUBLICATIONS

Ericsson,"On Data Transmission on Control Resource Set",3GPP TSG-RAN WG1 #88, R1-1703289, Feb. 13-17, 2017, 5 pages, Athens, Greece.
ZTE,"Resource sharing between PDCCH and PDSCH",3GPP TSG RAN WG1 Meeting #89 , R1-1707163, Hangzhou, China, May 15-19, 2017,total 9 pages.
Samsung:"Signaling for NR-PDCCH and PDSCH Multiplexing", 3GPP TSG RAN WG1 Meeting #89, R1-1707994, Hangzhou, China, May 15-19, 2017, total 3 pages.
"3rd Generation Partnership Project; Technical Specification Group Radio Access Network; NR; Radio Resource Control (RRC); Protocol specification (Release 15)", 3GPP TS 38.331 V0.0.3 (May 2017), 20 pages.
Huawei, HiSilicon: "sPDCCH multiplexing with data", 3GPP TSG RAN WG1 Meeting #88, R1-1701732, Feb. 13-17, 2017, 5 pages, Athens, Greece.
ZTE, ZTE Microelectronics, "Resource sharing between PDCCH and PDSCH", 3GPP TSG RAN WG1 #88bis, R1-1704371, Apr. 3-7, 2017, 5 pages, Spokane, USA.

\* cited by examiner

DATA RECEIVING METHOD, RELATED DEVICE, AND SYSTEM

CROSS-REFERENCE TO RELATED APPLICATIONS

This application is a continuation of International Application No. PCT/CN2018/090831, filed on Jun. 12, 2018, which claims priority to Chinese Patent Application No. 201710459167.8, filed on Jun. 16, 2017. The disclosures of the aforementioned applications are hereby incorporated by reference in their entireties.

TECHNICAL FIELD

The disclosure relates to the field of communication technologies, and in particular, to a data receiving method, a related device, and a system.

BACKGROUND

In a long term evolution (LTE) system, a control channel area is located in the first one to three symbols in a subframe, and a specific quantity of symbols occupied by the control channel area may be notified by using a physical control format indicator channel (PCFICH). In 5th generation mobile communication technology (5G) new radio (NR), a control resource set (CORESET) is defined to transmit control information, and each terminal may have one or more CORESETs. A CORESET of a terminal may include a common CORESET (shared by a plurality of terminals) and a CORESET specific to the terminal, and a control channel of the terminal is included in the CORESET of the terminal for transmission. In this case, how to improve resource utilization and prevent data received by a terminal from being polluted is a technical problem that is being researched by a person skilled in the art.

SUMMARY

A technical problem to be resolved by embodiments of the present invention is to provide a data receiving method, a related device, and a system, to improve resource utilization and prevent data pollution.

According to a first aspect, an embodiment of the present invention provides a data receiving method. The method includes: receiving, by a terminal, first indication information, where the first indication information is used to indicate a target frequency domain position; determining, by the terminal, a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer; and receiving, by the terminal, data on a target time-frequency resource, where the target time-frequency resource includes a second time-frequency resource and a part of resources in the first time-frequency resource, or the target time-frequency resource includes a second time-frequency resource but does not include the first time-frequency resource.

According to a second aspect, an embodiment of the present invention provides a data sending method. The method includes: sending, by a network device, first indication information to a terminal, where the first indication information is used to indicate a target frequency domain position; determining, by the network device, a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer; and sending, by the network device, data on a target time-frequency resource, where the target time-frequency resource includes a second time-frequency resource and a part of resources in the first time-frequency resource, or the target time-frequency resource includes a second time-frequency resource but does not include the first time-frequency resource.

Through implementation of the foregoing steps, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to another device, that is, data pollution can be prevented. In addition, time-frequency resources that are not used on the first several symbols in a scheduling time unit can be fully used to transmit data, thereby improving resource utilization.

Optionally, before the receiving, by the terminal, data on a target time-frequency resource in the first time-frequency resource, the method further includes: receiving, by the terminal, a first message sent by the network device, and correspondingly, sending, by the network device, the first message to the terminal. The first message may include third indication information, and a first status of the third indication information indicates the part of resources in the first time-frequency resource, or a second status of the third indication information indicates that the target time-frequency resource does not include the first time-frequency resource.

Optionally, before the determining, by the terminal, a first time-frequency resource based on a time domain position of a control resource set and the target frequency domain position, the method further includes: receiving, by the terminal, fourth indication information sent by the network device; and correspondingly, before the sending, by the network device, data on a target time-frequency resource, the method further includes: sending, by the network device, the fourth indication information to the terminal. The fourth indication information is used to indicate a relationship between the time domain position of the first time-frequency resource and the time domain position of the control resource set, for example, the fourth indication information is used to indicate that the time domain position of the first time-frequency resource is the same as the time domain position of the control resource set, or the fourth indication information is used to indicate that the time domain position of the first time-frequency resource is the same as the sum of the time domain position of the control resource set and the time domain positions of the N symbols. It may be understood that, the network device learns of a resource usage status of each accessing device. When there are a relatively large quantity of idle resources, the relationship between the time domain position of the first time-frequency resource and the time domain position of the control resource set may be indicated, so that the first time-frequency resource has a larger range. In this way, the target time-frequency resource scheduled for the terminal may have a larger range, thereby effectively improving resource utilization.

According to a third aspect, an embodiment of the present invention provides a terminal. The terminal includes a processor, a memory, and a transceiver. The memory is configured to store instructions, and the processor invokes the instructions in the memory to perform the method according to the first aspect and the implementations of the first aspect.

According to a fourth aspect, an embodiment of the present invention provides a network device. The network device includes a processor, a memory, and a transceiver. The memory is configured to store instructions, and the processor invokes the instructions in the memory to perform the method according to the second aspect and the implementations of the second aspect.

According to a fifth aspect, an embodiment of the present invention provides a terminal. The terminal includes a receiving unit and a processing unit, and is configured to perform the steps according to the first aspect and the implementations of the first aspect.

According to a sixth aspect, an embodiment of the present invention provides a network device. The network device includes a sending unit, a processing unit, and a receiving unit, and is configured to perform the steps according to the second aspect and the implementations of the second aspect.

Optionally, the first message further includes second indication information, and the second indication information is used to indicate the second time-frequency resource. In this way, resource overheads occupied by control information can be reduced. Optionally, whether the first message includes the third indication information may be indicated by using higher layer signaling (such as RRC signaling), or may be indicated by using information in downlink control information (DCI), or may be indicated by using a DCI format. The third indication information may exist for some DCI formats, and the third indication information may not exist for other DCI formats. Alternatively, there may be different configurations for different types of user equipment. The third indication information may exist for some types of user equipment, and the third indication information may not exist for other types of user equipment. The terminal is one type of user equipment.

Optionally, the target time-frequency resource includes the second time-frequency resource and the part of resources in the first time-frequency resource; and the part of resources in the first time-frequency resource include a time-frequency resource in the first time-frequency resource other than an area overlapping the control resource set; or the part of resources in the first time-frequency resource include a time-frequency resource in the first time-frequency resource other than an area overlapping search space; or the part of resources in the first time-frequency resource include a time-frequency resource in the first time-frequency resource other than an area overlapping a physical downlink control channel (PDCCH) already decoded by the terminal; or the part of resources in the first time-frequency resource include a time-frequency resource in the control resource set other than a PDCCH already decoded by the terminal; or the part of resources in the first time-frequency resource include a time-frequency resource in the search space other than a PDCCH already decoded by the terminal; or the part of resources in the first time-frequency resource include a time-frequency resource in the control resource set other than the search space. It may be understood that, the some specific resources in the first time-frequency resource may be preconfigured in the terminal and the network device, or may be notified to the terminal by using the first status of the third indication information included in the first message sent by the network device to the terminal. Optionally, the third indication information includes M information bits, where M is a positive integer. A first status of the M information bits corresponds to one case of the part of resources in the first time-frequency resource. A value of M is related to a quantity of cases of the part of resources in the first time-frequency resource that are supported by the terminal. Optionally, all cases of the part of resources in the first time-frequency resource that are supported by the terminal are configured by using higher layer signaling, or are preset in the terminal.

Optionally, the control resource set includes a plurality of control resource sets, a time domain start position of the control resource set is the same as a time domain start position of a first control resource set, and a time domain end position of the control resource set is the same as a time domain end position of a second control resource set, wherein the first control resource set is a control resource set with the foremost start time domain position in the plurality of control resource sets, and the second control resource set is a control resource set with the rearmost end time domain position in the plurality of control resource sets.

Optionally, the target frequency domain position is a frequency domain position of the second time-frequency resource, and the first indication information indicates the target frequency domain position by indicating the second time-frequency resource.

Optionally, the first time-frequency resource and the second time-frequency resource are discontinuous in time domain. It may be understood that, when the time domain position of the control resource set and a time domain position of the second time-frequency resource are discontinuous, that is, when a time-frequency resource at a time domain position between the time domain position of the second time-frequency resource and the time domain position of the control resource set is used by another device to receive data, the first time-frequency resource is divided, so that a time-frequency resource used by the terminal may be separated from the time-frequency resource used by the another device. In this way, the terminal can be prevented from receiving data sent by the network device to the another device, that is, data pollution can be prevented.

According to a seventh aspect, an embodiment of the present invention provides a communication system. The system includes a terminal and a network device. The terminal is the terminal described according to any one of the third aspect or the possible implementations of the third aspect, or any one of the fifth aspect or the possible implementations of the fifth aspect. The network device is the network device described according to any one of the fourth aspect or the possible implementations of the fourth aspect, or any one of the sixth aspect or the possible implementations of the sixth aspect.

According to an eighth aspect, an embodiment of the present invention provides a storage medium. The storage medium is configured to store instructions; and when the instructions are run on a processor of a terminal, the terminal performs the method described according to any one of the first aspect or the possible implementations of the first aspect; or when the instructions are run on a processor of a network device, the network device performs the method described according to any one of the second aspect or the possible implementations of the second aspect.

According to a ninth aspect, an embodiment of the present invention provides a computer program product including instructions. When the instructions are run on a computer, the computer is enabled to perform the method described according to any one of the first aspect, the second aspect, or the possible implementations.

Through implementation of the embodiments of the present invention, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to the another device, that is, data pollution can be prevented. In addition, time-frequency resources that are not used on the first several symbols in a scheduling time unit are fully used to transmit data, thereby improving resource utilization.

DETAILED DESCRIPTION OF ILLUSTRATIVE EMBODIMENTS

The following describes the embodiments of the present invention with reference to the accompanying drawings in the embodiments of the present invention.

Figure 1:
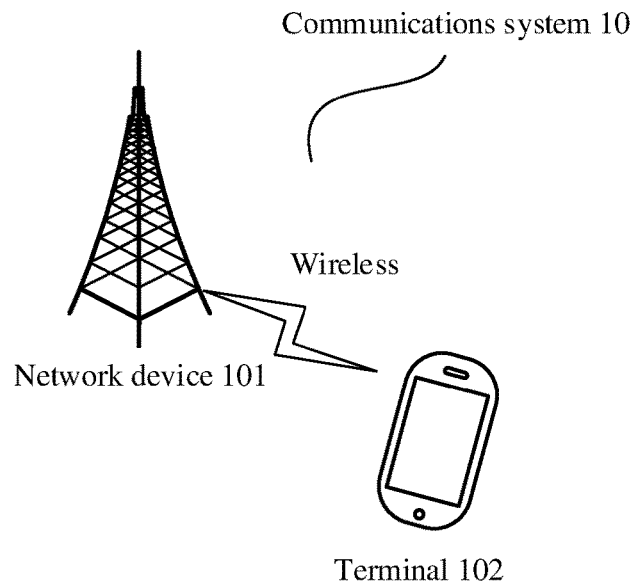
FIG. 1 is a schematic structural diagram of a communication system according to an embodiment of the present invention.

FIG. 1 is a schematic structural diagram of a communication system 10 according to an embodiment of the present invention. The communication system 10 includes a network device 101 and a terminal 102. The communication system 10 may be a communication system that uses a communication technology such as long term evolution (LTE), a 5th generation mobile communication technology (5G), another existing communication technology, or a subsequently studied communication technology. The network device 101 is a radio access node in the communication system, for example, an evolved NodeB (eNB) in LTE or a base station (such as a gNB) in 5G. The terminal 102 may be a mobile phone, a tablet computer, a notebook computer, a palmtop computer, a mobile internet device (MID for short), a wearable device (for example, a smartwatch (such as an iWatch), a smart band, or a pedometer), or a device that can access an operator's network. The terminal 102 may alternatively be a smart household device such as a refrigerator, a television, an air conditioner, or an electricity meter. The terminal 102 may alternatively be a transportation device such as a car, a bicycle, an electric vehicle, an airplane, or a ship. The terminal 102 may alternatively be a device that can perform wireless communication, such as an intelligent robot or a workshop device.

Figure 2:
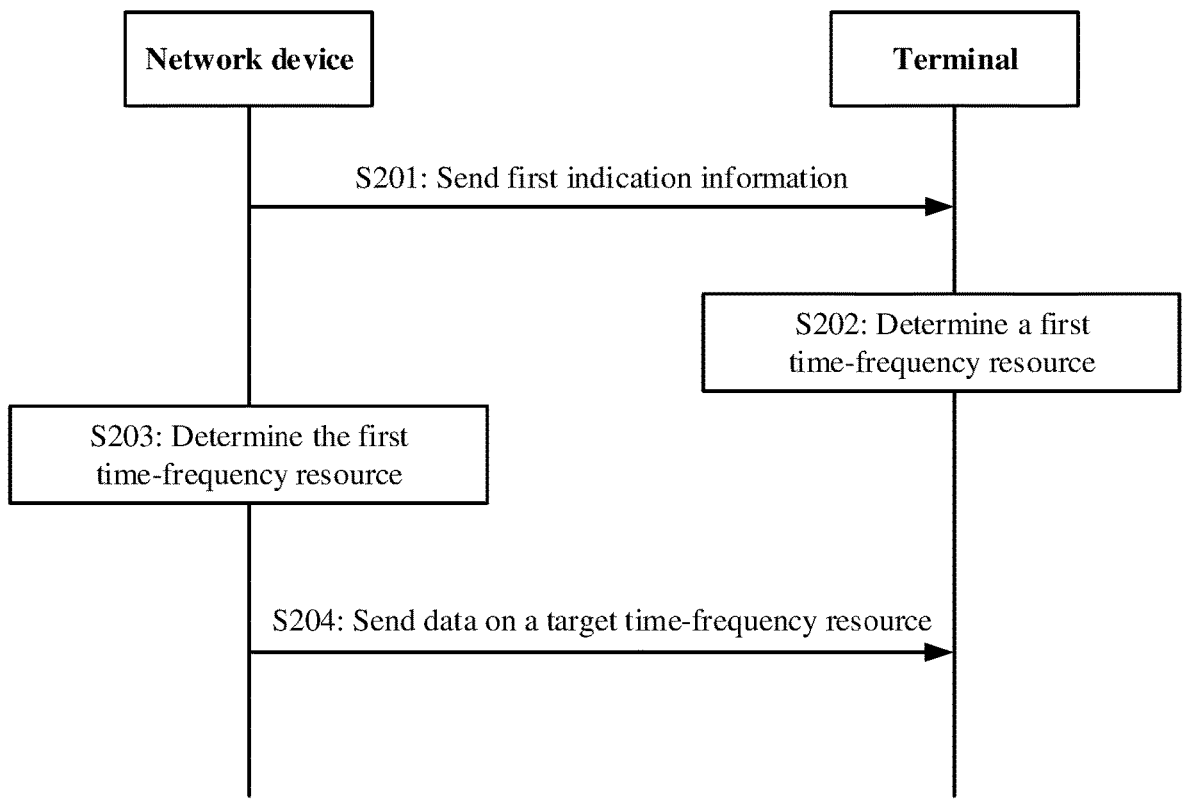
FIG. 2 is a schematic flowchart of a data receiving method according to an embodiment of the present invention.

FIG. 2 shows a data receiving method according to an embodiment of the present invention. The method may be implemented based on the communication system 10 shown in FIG. 1. The method includes but is not limited to the following steps.

Step S201: A network device sends first indication information to a terminal.

Specifically, the first indication information is used to indicate a target frequency domain position. Optionally, the first indication information may include a frequency parameter (for example, a frequency domain start position or a frequency domain length) of the target frequency domain position, to indicate the target frequency domain position. Optionally, the first indication information may include a specific piece of information having a correspondence with the target frequency domain position, to indicate the target frequency domain position. For example, a frequency domain position identifier corresponding to the target frequency domain position is encapsulated in the first indication information, to indicate the target frequency domain position.

In a first optional solution, the first indication information indicates the target frequency domain position by indicating a frequency domain position at which the terminal works, that is, a frequency band in which the terminal works. The first indication information may be carried in higher layer signaling (such as radio resource control (RRC) signaling), or may be carried in downlink control information (DCI). The first indication information may explicitly indicate the target frequency domain position, for example, indicate the target frequency domain position by indicating the frequency domain start position and a frequency domain end position of the target frequency domain position, or may implicitly indicate the target frequency domain position, for example, indicate the target frequency domain position by using an identifier indicating a frequency domain range.

Correspondingly, the terminal receives the first indication information.

Specifically, after receiving the first indication information, the terminal obtains content of the first indication information through decoding, to determine the target frequency domain position. For example, the first indication information indicates the target frequency domain position, the first indication information includes the frequency domain position identifier corresponding to the target frequency domain position, and the terminal may determine the target frequency domain position based on the frequency domain position identifier. For another example, the first indication information indicates the target frequency domain position, the first indication information includes the frequency domain start position and the frequency domain length of the target frequency domain position, and the terminal may determine the target frequency domain position based on the frequency domain start position and the frequency domain length that are included in the first indication information. Certainly, indication may alternatively be implemented in another manner. For example, the first indication information includes the frequency domain start position and the frequency domain end position of the target frequency domain position.

Step S202: The terminal determines a first time-frequency resource based on a time domain position of a control resource set and the target frequency domain position.

Specifically, a frequency domain position of the first time-frequency resource is the same as the target frequency domain position. In addition, a time domain position of the first time-frequency resource is the same as the time domain position of the control resource set or is the same as a time domain position obtained by adding N symbols to the time domain position of the control resource set, where N is a positive integer. The control resource set may be a control resource set (CORESET), and information about the control resource set may be preset in the terminal and the network device, or may be notified by the network device to the terminal in advance by using signaling. The signaling may be higher layer signaling such as RRC signaling, or may be DCI. Therefore, the terminal learns of the time domain position of the control resource set, and therefore, herein, may determine the frequency domain position of the first time-frequency resource based on the time domain position of the control resource set.

Figure 3:
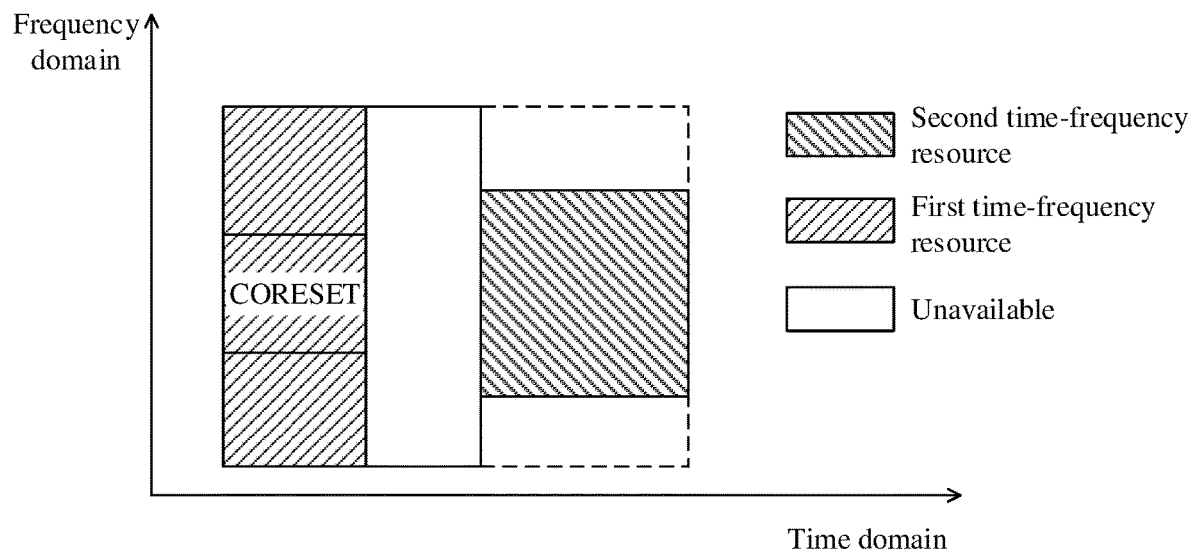
FIG. 3 is a schematic diagram of a time-frequency resource according to this embodiment of the present invention.

In this embodiment of the present invention, the control resource set may be one control resource set, or may be a set of a plurality of control resource sets. When the control resource set is a set of a plurality of control resource sets, a time domain start position of the control resource set is the same as a time domain start position of a first control resource set, and a time domain end position of the control resource set is the same as a time domain end position of a second control resource set, wherein the first control resource set is a control resource set with the foremost start time domain position in the plurality of control resource sets, and the second control resource set is a control resource set with the rearmost end time domain position in the plurality of control resource sets. The following lists several possible cases of the first time-frequency resource with reference to the figures. In coordinates in each figure, a horizontal axis indicates a time domain and a vertical axis indicates a frequency domain. Each figure shows the first time-frequency resource, an "unavailable" area, a second time-frequency resource, the control resource set, search space (SS), and a downlink physical control channel (PDCCH) (used to carry control information of the terminal, for example, the first indication information). The "unavailable" area is a time-frequency resource reserved for a device other than the terminal. The several cases are specifically as follows:

Case 1: The control resource set is one control resource set, and the time domain position of the first time-frequency resource is the same as a time domain position of the control resource set. If the frequency domain position of the first time-frequency resource is the same as the target frequency domain position, the first time-frequency resource is shown in FIG. 3.

Figure 4:
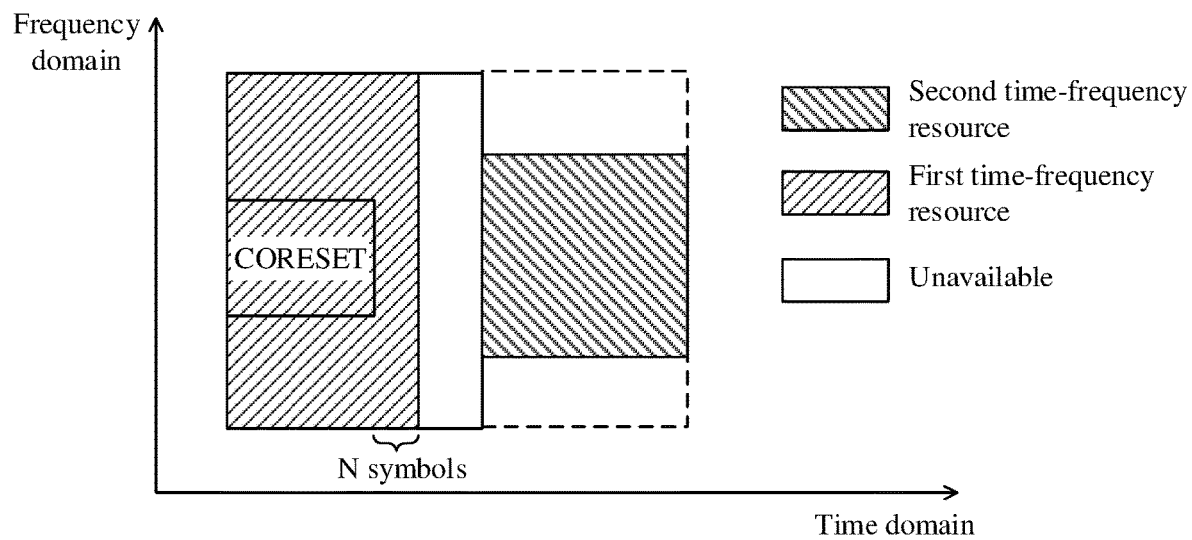
FIG. 4 is a schematic diagram of another time-frequency resource according to this embodiment of the present invention.

Case 2: The control resource set is one control resource set, and the time domain position of the first time-frequency resource is the same as a time domain position obtained by adding the N symbols to a time domain position of the control resource set, where N is a positive integer. If the frequency domain position of the first time-frequency resource is the same as the target frequency domain position, the first time-frequency resource is shown in FIG. 4.

Figure 5:
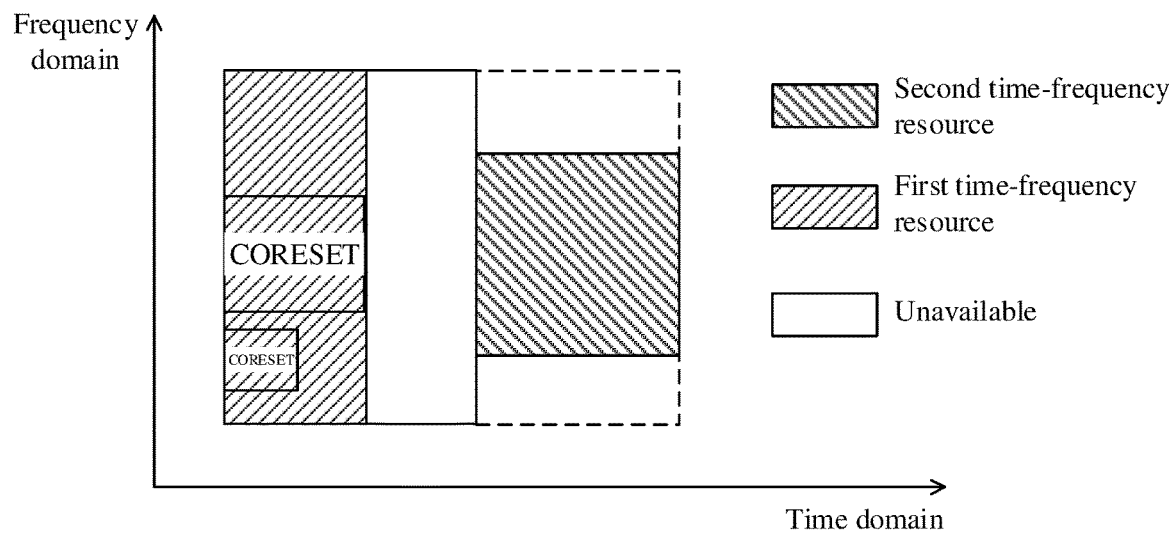
FIG. 5 is a schematic diagram of another time-frequency resource according to this embodiment of the present invention.

Case 3: The control resource set is a plurality of control resource sets. Time domain positions of the plurality of control resource sets may be in an inclusion relationship, partially overlap, or completely not overlap. Regardless of which case, it may be determined that the time domain start position of the control resource set is the same as the time domain start position of the first control resource set, and a time domain end position of the control resource set is the same as the time domain end position of the second control resource set, wherein the first control resource set is a control resource set with the foremost start time domain position in the plurality of control resource sets, and the second control resource set is a control resource set with the rearmost end time domain position in the plurality of control resource sets. If the frequency domain position of the first time-frequency resource is the same as the target frequency domain position, the first time-frequency resource is shown in FIG. 5.

Figure 6:
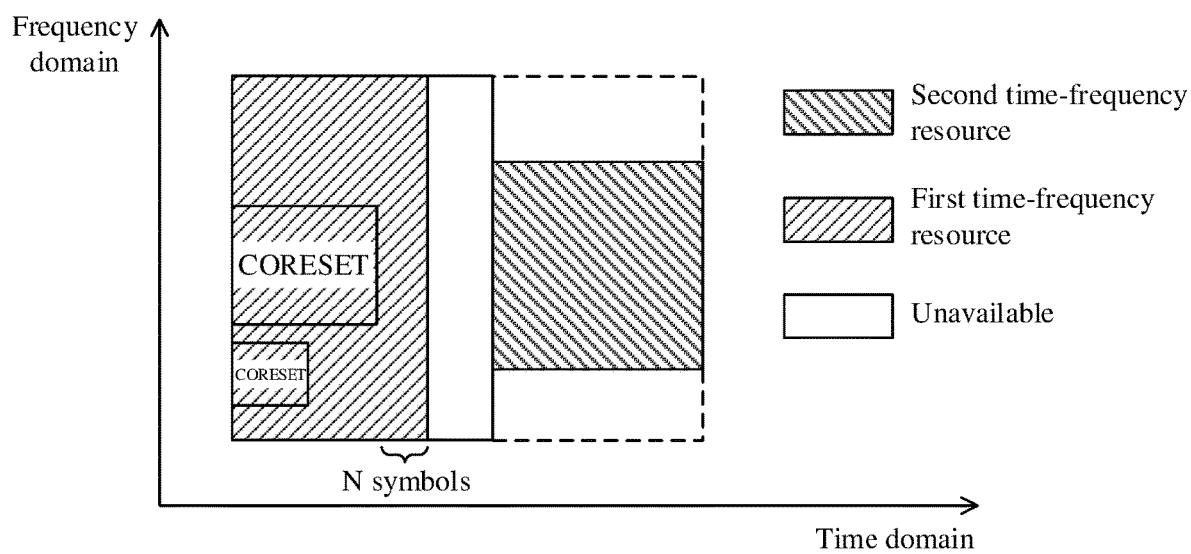
FIG. 6 is a schematic diagram of another time-frequency resource according to this embodiment of the present invention.

Case 4: The control resource set is a plurality of control resource sets. Time domain positions of the plurality of control resource sets may be in an inclusion relationship, partially overlap, or completely not overlap. Regardless of which case, it may be determined that a time domain start position of the control resource set is the same as the time domain start position of the first control resource set, and a time domain end position of the control resource set is the same as a time domain position obtained by adding the N symbols to the time domain end position of the second control resource set. If the frequency domain position of the first time-frequency resource is the same as the target frequency domain position, the first time-frequency resource is shown in FIG. 6.

In the first optional solution, a rule is preconfigured in the terminal to specify how the terminal specifically determines the first time-frequency resource based on the time domain position of the control resource set and the target frequency domain position. Optionally, the rule specifies a relationship between the time domain position of the first time-frequency resource and the time domain position of the control resource set and/or a relationship between the frequency domain position of the first time-frequency resource and the target frequency domain position. For example, the rule specifies that the time domain position of the first time-frequency resource is the same as the time domain position of the control resource set. In this way, the terminal may determine the first time-frequency resource in the manner in Case 1 according to the rule.

In a second optional solution, before the terminal determines the first time-frequency resource, the network device sends fourth indication information to the terminal, and correspondingly, the terminal receives the fourth indication information sent by the network device. The fourth indication information may be higher layer signaling such as RRC signaling, or the fourth indication information may be DCI. The fourth indication information is used to indicate a relationship between the time domain position of the first time-frequency resource and the time domain position of the control resource set and/or a relationship between the frequency domain position of the first time-frequency resource and the target frequency domain position. For example, the fourth indication information indicates that the time domain position of the first time-frequency resource is the same as the time domain position obtained by adding the N symbols to the time domain position of the control resource set. For another example, the fourth indication information indicates that the time domain position of the first time-frequency resource is the same as the time domain position of the control resource set. In this way, the terminal may determine the first time-frequency resource in the manner in Case 2 according to the indication of the fourth indication information. Optionally, the fourth indication information and the first indication information may be carried in a same piece of indication information, and/or the fourth indication information and the third indication information may be carried in a same piece of indication information.

The first time-frequency resource is described above, and a target time-frequency resource is described below. The target time-frequency resource includes the second time-frequency resource and a part of resources in the first time-frequency resource; or the target time-frequency resource includes the second time-frequency resource but does not include the first time-frequency resource. The second time-frequency resource may be a time-frequency resource scheduled by the network device for the terminal, for example, a time-frequency resource scheduled by the network device for the terminal by using second indication information.

Figure 7:
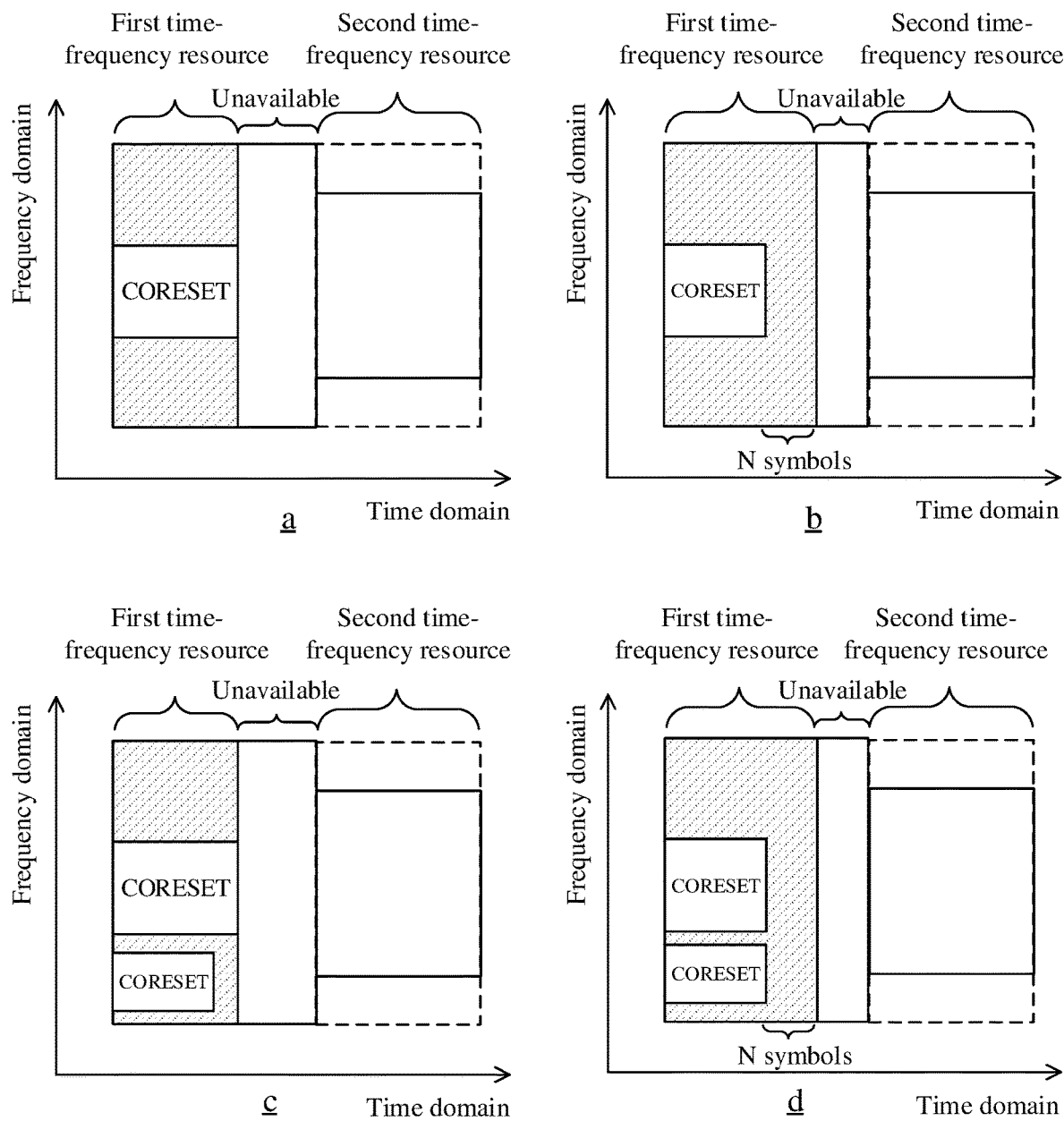
FIG. 7 is a schematic diagram of another time-frequency resource according to this embodiment of the present invention.

When the target time-frequency resource includes the second time-frequency resource and the part of resources in the first time-frequency resource, there are the following several possible solutions for the part of resources in the first time-frequency resource:

In a first solution, the part of resources in the first time-frequency resource include a time-frequency resource in the first time-frequency resource other than an area overlapping the control resource set. The control resource set may be in the first time-frequency resource, or may be outside the first time-frequency domain resource, and may further partially overlap the first time-frequency resource. When the control resource set is in the first time-frequency resource, "the area overlapping the control resource set" is all of an area occupied by the control resource set. When the control resource set is outside the first time domain resource, "the area overlapping the control resource set" does not exist. In this case, "the time-frequency resource in the first time-frequency resource other than the area overlapping the control resource set" is the first time-frequency resource. An example in which the control resource set is in the first time-frequency resource is used below to describe the part of resources in the first time-frequency resource. Referring to FIG. 7, when the time domain position of the first time-frequency resource meets "Case 1", the part of resources in the first time-frequency resource are shown in a part a in FIG. 7. When the time domain position of the first time-frequency resource meets "Case 2", the part of resources in the first time-frequency resource are shown in a part b in FIG. 7. When the time domain position of the first time-frequency resource meets "Case 3", the part of resources in the first time-frequency resource are shown in a part c in FIG. 7. When the time domain position of the first time-frequency resource meets "Case 4", the part of resources in the first time-frequency resource are shown in a part d in FIG. 7. A grid part in FIG. 7 is the part of resources in the first time-frequency resource. Optionally, the network device may avoid, as much as possible, transmitting a control resource set of another device on the part of resources in the first time-frequency resource. However, this brings a particular limitation to scheduling performed by the network device. To reduce such a limitation, optionally, the network device may notify the terminal of a time-frequency resource position of the control resource set of the another device by using signaling. In this case, the part of resources in the first time-frequency resource include neither a control resource set of the terminal nor the control resource set of the another device. In other words, "the area overlapping the control resource set" includes both an area overlapping the control resource set of the terminal and an area overlapping the control resource set of the another device, that is, includes an area overlapping all known control resource sets of the terminal.

Figure 8:
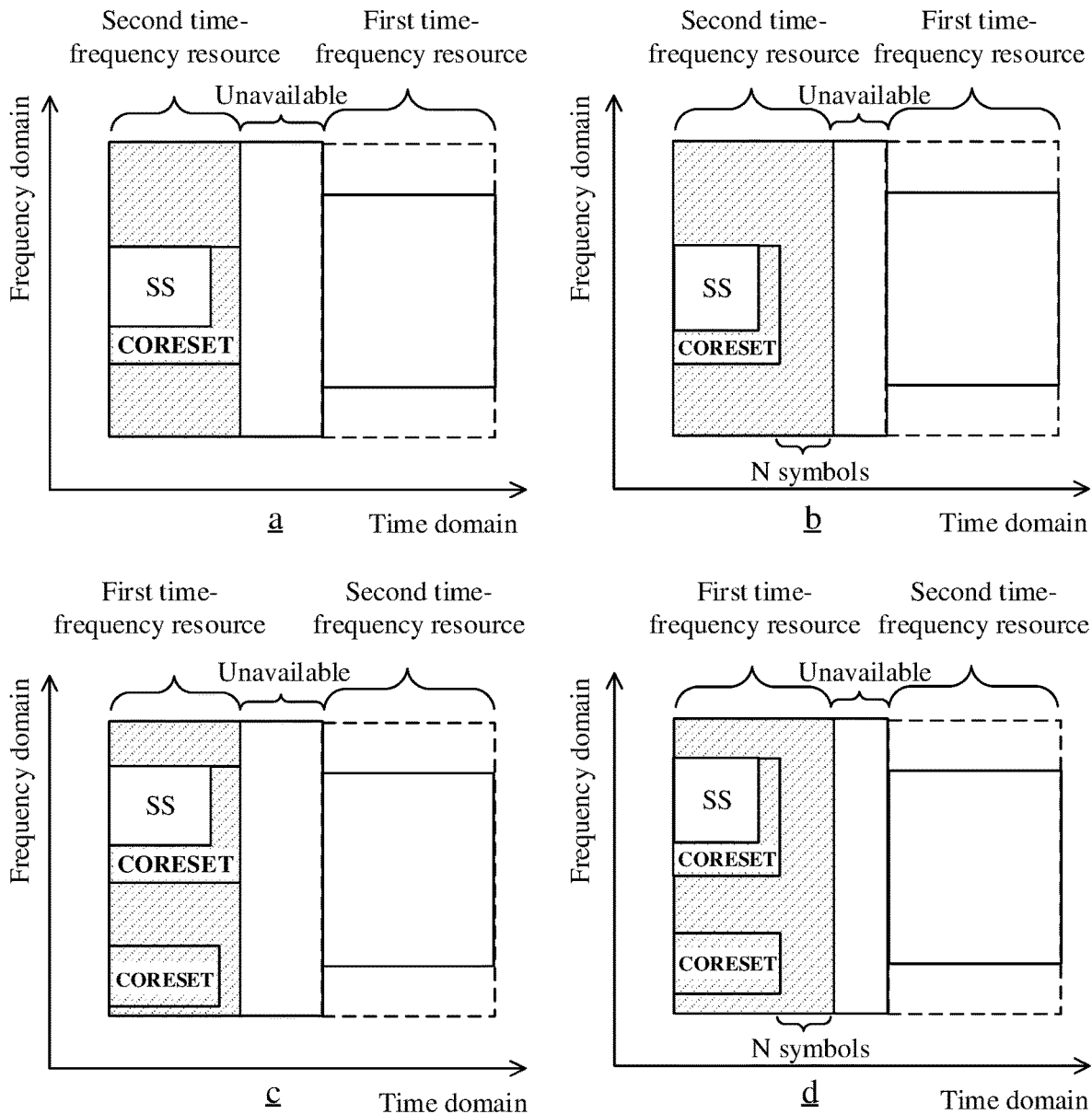
FIG. 8 is a schematic diagram of another time-frequency resource according to this embodiment of the present invention.

In a second solution, the part of resources in the first time-frequency resource include a time-frequency resource in the first time-frequency resource other than an area overlapping search space. The search space may be in the first time-frequency resource, or may be outside the first time domain resource, and may further partially overlap the first time-frequency resource. When the search space is in the first time-frequency resource, "the area overlapping the search space" is all of an area occupied by the search space. When the search space is outside the first time domain resource, "the area overlapping the search space" does not exist. In this case, "the time-frequency resource in the first time-frequency resource other than the area overlapping the search space" is the first time-frequency resource. An example in which the search space is in the first time-frequency resource is used below to describe the part of resources in the first time-frequency resource. Referring to FIG. 8, when the time domain position of the first time-frequency resource meets "Case 1", the part of resources in the first time-frequency resource are shown in a part a in FIG. 8. When the time domain position of the first time-frequency resource meets "Case 2", the part of resources in the first time-frequency resource are shown in a part b in FIG. 8. When the time domain position of the first time-frequency resource meets "Case 3", the part of resources in the first time-frequency resource are shown in a part c in FIG. 8. When the time domain position of the first time-frequency resource meets "Case 4", the part of resources in the first time-frequency resource are shown in a part d in FIG. 8. A grid part in FIG. 8 is the part of resources in the first time-frequency resource. Optionally, the network device may avoid, as much as possible, mapping search space of another device to the part of resources in the first time-frequency resource. However, this brings a particular limitation to scheduling performed by the network device. To reduce such a limitation, optionally, if the network device maps the search space of another device to the part of resources in the first time-frequency resource, the network device may notify the terminal of the search space of the another device by using signaling. In this case, the part of resources in the first time-frequency resource include neither search space of the terminal nor a time-frequency resource position occupied by the search space of the another device. In other words, "the area overlapping the search space" includes both an area overlapping the search space of the terminal and an area overlapping the search space of the another device, that is, includes an area overlapping all known search space of the terminal.

In a third solution, the part of resources in the first time-frequency resource include a time-frequency resource in the first time-frequency resource other than an area overlapping a physical downlink control channel (PDCCH) already decoded by the terminal. The PDCCH already decoded by the terminal may be in the first time-frequency resource, or may be outside the first time domain resource, and may further partially overlap the first time-frequency resource. When the PDCCH already decoded by the terminal is in the first time-frequency resource, "the area overlapping the PDCCH already decoded by the terminal" is all of an area occupied by the PDCCH already decoded by the terminal. When the PDCCH already decoded by the terminal is outside the first time domain resource, "the area overlapping the PDCCH already decoded by the terminal" does not exist. In this case, "the time-frequency resource in the first time-frequency resource other than the area overlapping the PDCCH already decoded by the terminal" is the first time-frequency resource. In this embodiment of the present invention, for all the mentioned indication information such as the foregoing first indication information and third indication information, and subsequently mentioned fourth indication information and second indication information, the PDCCH already decoded by the terminal includes the indication information, provided that the indication information is carried in the DCI and is decoded.

Figure 9:
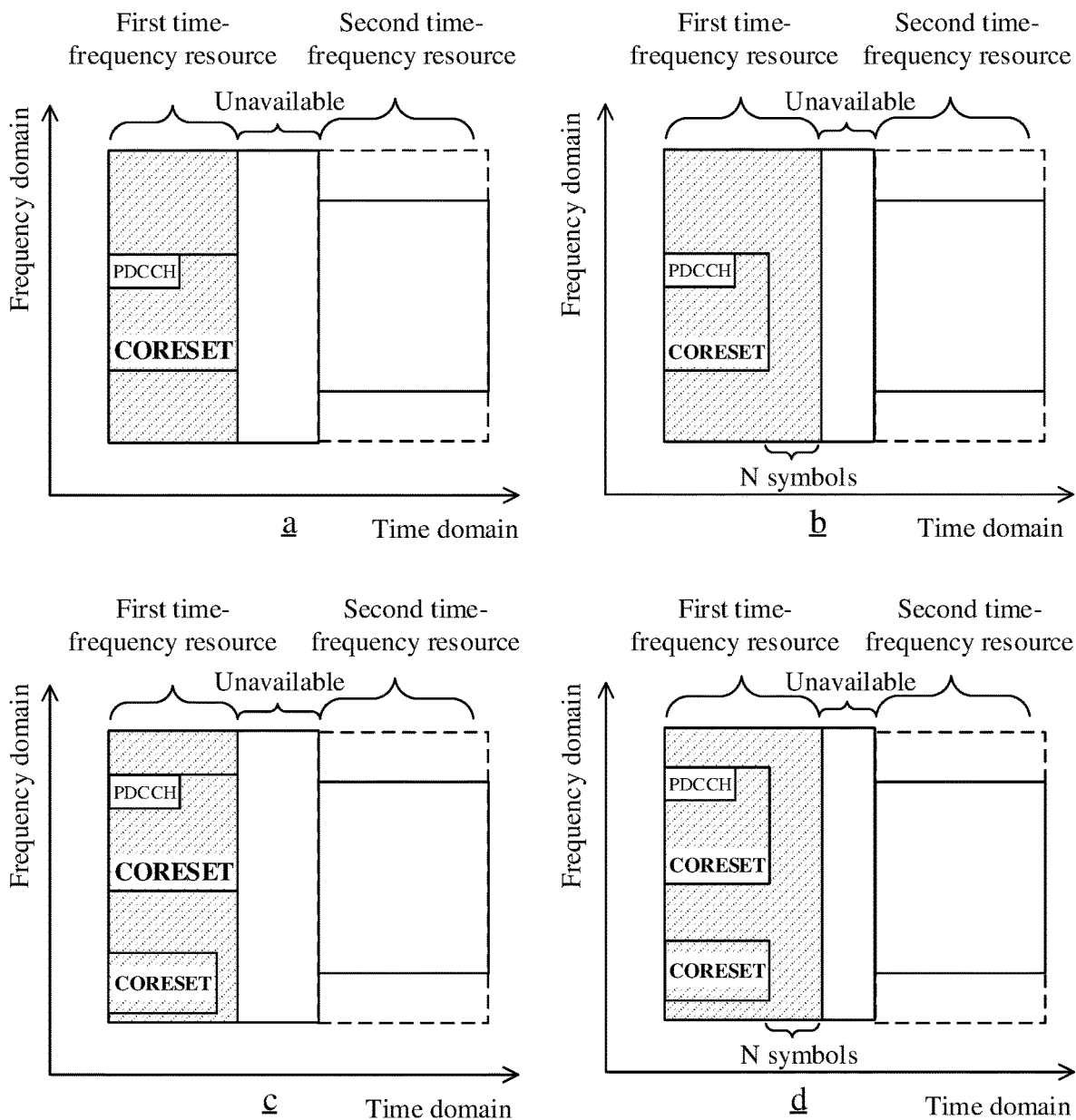
FIG. 9 is a schematic diagram of another time-frequency resource according to this embodiment of the present invention.

An example in which the PDCCH already decoded by the terminal is in the first time-frequency resource is used below to describe the part of resources in the first time-frequency resource. Referring to FIG. 9, when the time domain position of the first time-frequency resource meets "Case 1", the part of resources in the first time-frequency resource are shown in a part a in FIG. 9. When the time domain position of the first time-frequency resource meets "Case 2", the part of resources in the first time-frequency resource are shown in a part b in FIG. 9. When the time domain position of the first time-frequency resource meets "Case 3", the part of resources in the first time-frequency resource are shown in a part c in FIG. 9. When the time domain position of the first time-frequency resource meets "Case 4", the part of resources in the first time-frequency resource are shown in a part d in FIG. 9. A grid part in FIG. 9 is the part of resources in the first time-frequency resource. Optionally, the network device may avoid, as much as possible, mapping a PDCCH of another device to the part of resources in the first time-frequency resource. Optionally, if the network device maps the PDCCH of another device to the part of resources in the first time-frequency resource, the network device may notify the terminal of a time-frequency resource position of the PDCCH of the another device by using signaling.

Figure 10:
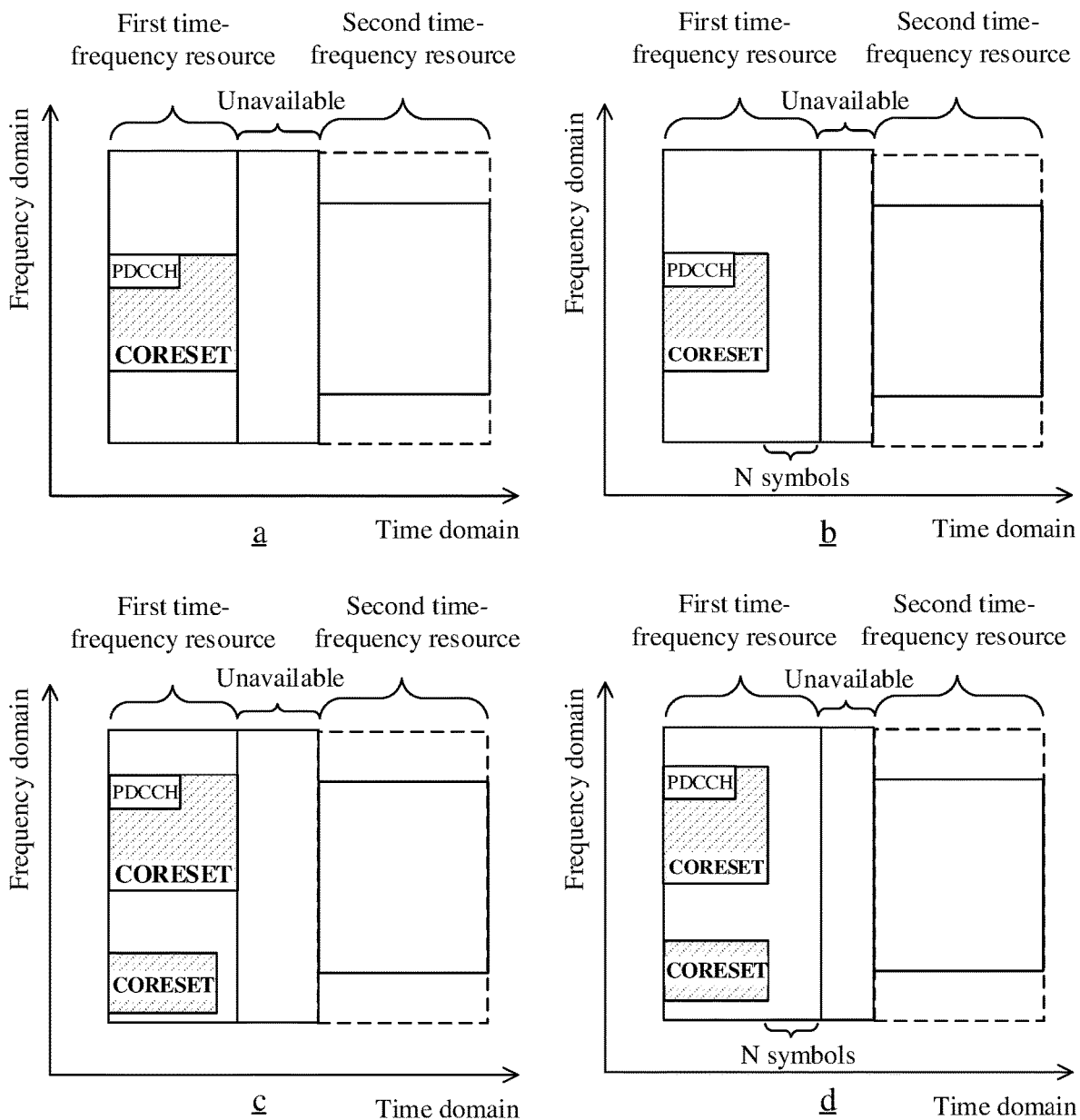
FIG. 10 is a schematic diagram of another time-frequency resource according to this embodiment of the present invention.

In a fourth solution, the part of resources in the first time-frequency resource include a time-frequency resource in an area of the control resource set other than a PDCCH already decoded by the terminal. The control resource set may be in the first time-frequency resource, or may be outside the first time domain resource, and may further partially overlap the first time-frequency resource. "The time-frequency resource in the area of the control resource set other than the PDCCH already decoded by the terminal" is a remaining time-frequency resource, in an area in which the first time-frequency resource overlaps the control resource set, other than the PDCCH already decoded by the terminal. An example in which the control resource set is in the first time-frequency resource is used below to describe the part of resources in the first time-frequency resource. Referring to FIG. 10, when the time domain position of the first time-frequency resource meets "Case 1", the part of resources in the first time-frequency resource are shown in a part a in FIG. 10. When the time domain position of the first time-frequency resource meets "Case 2", the part of resources in the first time-frequency resource are shown in a part b in FIG. 10. When the time domain position of the first time-frequency resource meets "Case 3", the part of resources in the first time-frequency resource are shown in a part c in FIG. 10. When the time domain position of the first time-frequency resource meets "Case 4", the part of resources in the first time-frequency resource are shown in a part d in FIG. 10. A grid part in FIG. 10 is the part of resources in the first time-frequency resource. Optionally, the network device needs to avoid, as much as possible, mapping a PDCCH of another device to the control resource set. Optionally, if the network device maps the PDCCH of another device to the part of resources in the first time-frequency resource, the network device may notify the terminal of a time-frequency resource position of the PDCCH of the another device by using signaling.

Figure 11:
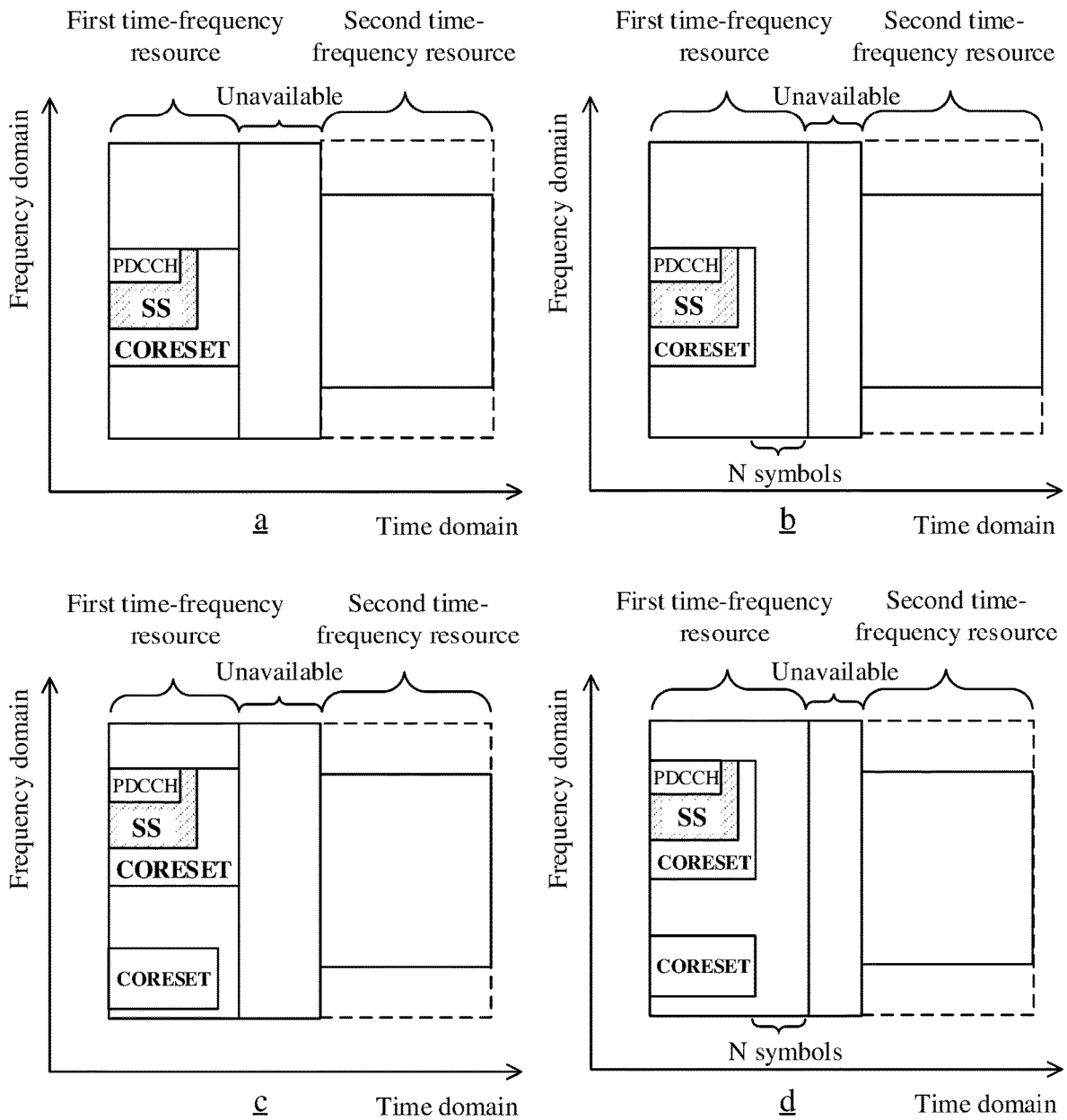
FIG. 11 is a schematic diagram of another time-frequency resource according to this embodiment of the present invention.

In a fifth solution, the part of resources in the first time-frequency resource include a time-frequency resource in an area of the search space other than a PDCCH already decoded by the terminal. The search space may be in the first time-frequency resource, or may be outside the first time domain resource, and may partially overlap the first time-frequency resource. "The time-frequency resource in the area of the search space other than the PDCCH already decoded by the terminal" is a remaining time-frequency resource, in an area in which the first time-frequency resource overlaps the search space, other than the PDCCH already decoded by the terminal. An example in which the search space is in the first time-frequency resource is used below to describe the part of resources in the first time-frequency resource. Referring to FIG. 11, when the time domain position of the first time-frequency resource meets "Case 1", the part of resources in the first time-frequency resource are shown in a part a in FIG. 11. When the time domain position of the first time-frequency resource meets "Case 2", the part of resources in the first time-frequency resource are shown in a part b in FIG. 11. When the time domain position of the first time-frequency resource meets "Case 3", the part of resources in the first time-frequency resource are shown in a part c in FIG. 11. When the time domain position of the first time-frequency resource meets "Case 4", the part of resources in the first time-frequency resource are shown in a part d in FIG. 11. A grid part in FIG. 11 is the part of resources in the first time-frequency resource. Optionally, the network device needs to avoid, as much as possible, mapping a PDCCH of another device to the search space. Optionally, if the network device maps the PDCCH of another device to the part of resources in the first time-frequency resource, the network device may notify the terminal of a time-frequency resource position of the PDCCH of the another device by using signaling.

Figure 12:
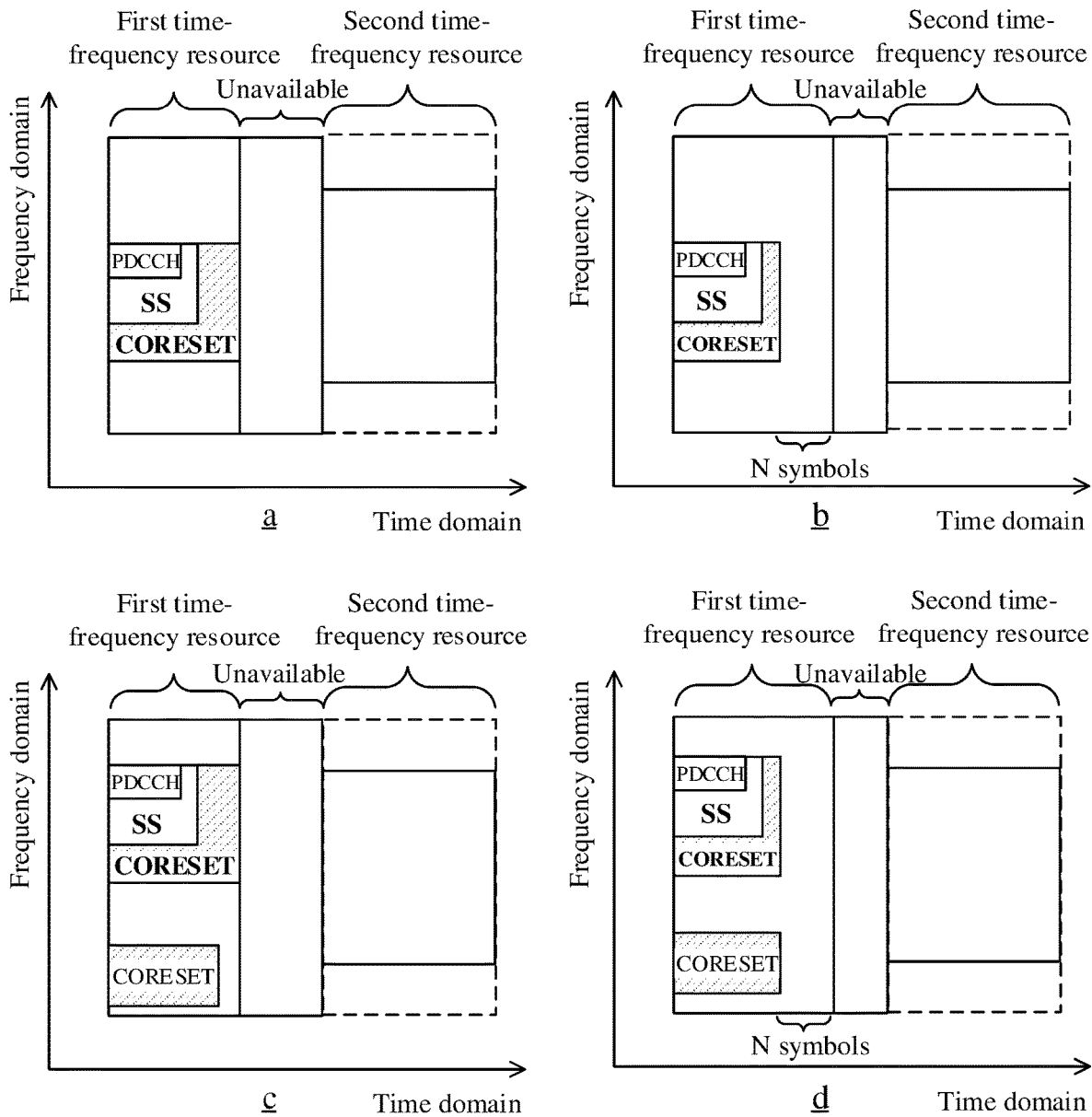
FIG. 12 is a schematic diagram of another time-frequency resource according to this embodiment of the present invention.

In a sixth solution, the part of resources in the first time-frequency resource include a time-frequency resource in the control resource set other than the search space. The control resource set may be in the first time-frequency resource, or may be outside the first time domain resource, and may further partially overlap the first time-frequency resource. "The time-frequency resource in the control resource set other than the search space" is a remaining time-frequency resource, in an area in which the first time-frequency resource overlaps the control resource set, other than the search space. An example in which the control resource set is in the first time-frequency resource is used below to describe the part of resources in the first time-frequency resource. Referring to FIG. 12, when the time domain position of the first time-frequency resource meets "Case 1", the part of resources in the first time-frequency resource are shown in a part a in FIG. 12. When the time domain position of the first time-frequency resource meets "Case 2", the part of resources in the first time-frequency resource are shown in a part b in FIG. 12. When the time domain position of the first time-frequency resource meets "Case 3", the part of resources in the first time-frequency resource are shown in a part c in FIG. 12. When the time domain position of the first time-frequency resource meets "Case 4", the part of resources in the first time-frequency resource are shown in a part d in FIG. 12. A grid part in FIG. 12 is the part of resources in the first time-frequency resource. Optionally, the network device needs to avoid, as much as possible, mapping search space of another device to the search space. Optionally, if the network device maps the search space of another device to the part of resources in the first time-frequency resource, the network device may notify the terminal of a time-frequency resource position of the search space of the another device by using signaling.

In this embodiment of the present invention, the terminal may support only one of the foregoing cases, or may support any combination of at least two of the foregoing cases. The terminal may directly determine the part of resources in the first time-frequency resource based on a preconfiguration. For example, the preconfiguration is that the terminal determines the part of resources in the first time-frequency resource by using the "second" solution, so that the terminal determines the part of resources in the first time-frequency resource by using the "second" solution. In addition, the network device may send a first message to the terminal, and the terminal receives the first message sent by the network device, where the first message includes third indication information, and a first status of the third indication information indicates the part of resources in the first time-frequency resource, or a second status of the third indication information indicates that the target time-frequency resource does not include the first time-frequency resource. Optionally, the third indication information indicates a solution used to determine the part of resources in the first time-frequency resource. Therefore, the terminal may determine the part of resources in the first time-frequency resource according to the solution indicated by the third indication information. The first message may be higher layer signaling such as RRC signaling, or may be DCI. Optionally, whether the first message includes the third indication information may be configuration information notified by using higher layer signaling (such as RRC signaling), or may be notified by using downlink control information (DCI), or may be bound to a DCI format. Some DCI formats include third indication information, and some DCI formats do not. There may be different configurations for different types of users. The third indication information exists for some types of users, and the third indication information does not exist for other types of users. The terminal is one type of user. For example, an indication field is configured in the third indication information, one status of the indication field corresponds to different solutions for the part of resources in the first time-frequency resource, and another status of the indication field is used to indicate that the target time-frequency resource does not include the first time-frequency resource. For example, the indication field includes N bits, where N is a positive integer. Assuming that N=3, 001 may be used to indicate that the part of resources in the first time-frequency resource are the part of resources in the first time-frequency resource that are described in the "first" solution, 010 may be used to indicate that the part of resources in the first time-frequency resource are the part of resources in the first time-frequency resource that are described in the "second" solution, 011 may be used to indicate that the part of resources in the first time-frequency resource are the part of resources in the first time-frequency resource that are described in the "third" solution, 100 may be used to indicate that the part of resources in the first time-frequency resource are the part of resources in the first time-frequency resource that are described in the "fourth" solution, 101 may be used to indicate that the part of resources in the first time-frequency resource are the part of resources in the first time-frequency resource that are described in the "fifth" solution, 100 may be used to indicate that the part of resources in the first time-frequency resource are the part of resources in the first time-frequency resource that are described in the "sixth" solution, and 111 may be used to indicate that data is not received on the first time-frequency resource. Correspondingly, after receiving the third indication information, if obtaining, through parsing, that a value of the indication field in the third indication information is 001, the terminal determines the part of resources in the first time-frequency resource by using the "first" solution; if obtaining, through parsing, that a value of the indication field in the third indication information is 010, the terminal determines the part of resources in the first time-frequency resource by using the "second" solution; if obtaining, through parsing, that a value of the indication field in the third indication information is 011, the terminal determines the part of resources in the first time-frequency resource by using the "third" solution; if obtaining, through parsing, that a value of the indication field in the third indication information is 100, the terminal determines the part of resources in the first time-frequency resource by using the "fourth" solution; if obtaining, through parsing, that a value of the indication field in the third indication information is 101, the terminal determines the part of resources in the first time-frequency resource by using the "fifth" solution; if obtaining, through parsing, that a value of the indication field in the third indication information is 110, the terminal determines the part of resources in the first time-frequency resource by using the "sixth" solution; or if obtaining, through parsing, that a value of the indication field in the third indication information is 111, the terminal learns that data is not received on the first time-frequency resource. Similarly, N may be equal to 2, and therefore only a maximum of four solutions may be indicated. For example, 00 may be used to indicate that the part of resources in the first time-frequency resource are the part of resources in the first time-frequency resource that are described in the "first" solution, 01 may be used to indicate that the part of resources in the first time-frequency resource are the part of resources in the first time-frequency resource that are described in the "second" solution, 10 may be used to indicate that the part of resources in the first time-frequency resource are the part of resources in the first time-frequency resource that are described in the "third" solution, and 11 may be used to indicate that data is not received on the first time-frequency resource. The part of resources in all first time-frequency resources that may be used to receive data may include any combination of the foregoing six solutions, or may include another similar solution. A quantity of bits in an information field in the third indication information may be determined based on a quantity of supported solutions, and one status of the information field in the third indication information may be used to indicate that data is not received on the first time-frequency resource.

If the first message received by the terminal does not include the third indication information, the terminal does not need to receive data on the first time-frequency resource. In other words, the terminal does not need to determine the first time-frequency resource.

Several optional solutions for the part of resources in the first time-frequency resource are described above. Optionally, when different conditions are met, solutions for determining the part of resources in the first time-frequency resource may be different. For example, if Condition 1 is met, the part of resources in the first time-frequency resource are the part of resources in the first time-frequency resource that are described in "Solution 1"; if Condition 2 is met, the part of resources in the first time-frequency resource are the part of resources in the first time-frequency resource that are described in "Solution 2"; if Condition 3 is met, the part of resources in the first time-frequency resource are the part of resources in the first time-frequency resource that are described in "Solution 3"; if Condition 4 is met, the part of resources in the first time-frequency resource are the part of resources in the first time-frequency resource that are described in "Solution 4"; or if Condition 5 is met, the part of resources in the first time-frequency resource are the part of resources in the first time-frequency resource that are described in "Solution 5". Condition 1, Condition 2, Condition 3, Condition 4, and Condition 5 are different conditions. Specific content of these conditions is not limited herein.

Step S203: The network device determines the first time-frequency resource based on the time domain position of the control resource set and the target frequency domain position.

Specifically, a manner in which the network device determines the first time-frequency resource is the same as a manner in which the terminal determines the first time-frequency resource, and the first time-frequency resource determined by the network device and the first time-frequency resource determined by the terminal are also a same time-frequency resource. It may be understood that, the network device knows a control resource set of each device accessing the network device, and therefore the control resource set used by the terminal in step S202 is also known by the network device. In addition, the target frequency domain position used by the terminal in step S202 is also indicated by the network device to the terminal by using the first indication information. In other words, the network device also has information about the target frequency domain position. Therefore, the network device may determine the first time-frequency resource based on the control resource set and the target frequency domain position, and the determined first time-frequency resource is the same as the first time-frequency resource determined by the terminal. A feature of the first time-frequency resource is already described in detail in step S202, and details are not described herein again. It may be understood that, a sequence of step S203 and steps S202 and S201 is not limited herein. In implementable solutions, step S203 is performed before S201, after S201 and before S202, or after S202.

Step S204: The network device sends data to the terminal on the target time-frequency resource.

Specifically, the target time-frequency resource includes the second time-frequency resource and the part of resources in the first time-frequency resource; or the target time-frequency resource includes the second time-frequency resource but does not include the first time-frequency resource. The second time-frequency resource may be a time-frequency resource scheduled by the network device for the terminal, for example, a time-frequency resource scheduled by the network device for the terminal by using the second indication information. Optionally, the second indication information and the third indication information may be different bit fields in a same piece of indication information. When the target time-frequency resource includes the second time-frequency resource and the part of resources in the first time-frequency resource, there may be a plurality of possible solutions for the part of resources in the first time-frequency resource. The plurality of possible solutions are described in detail in step S202, and details are not described herein again. It may be understood that, a part specifically included in the target time-frequency resource is predefined in the terminal and the network device. In this way, the network device and the terminal may determine a same target time-frequency resource based on a same setting. Alternatively, a specific part included in the target time-frequency resource may be indicated by the network device to the terminal. In this way, it can also be ensured that the network device and the terminal use a same target time-frequency resource. Optionally, "data" herein is data other than signaling (or control information).

Optionally, different parts of a same data block are mapped to the second time-frequency resource included in the target time-frequency resource and the part of resources in the first time-frequency resource. That is, data on the two pairs of resources jointly forms a complete data block, and the data block may be a transport block (TB), a code block group (CBG), or a code block (CB).

Correspondingly, the terminal receives, on the target time-frequency resource, the data sent by the network device.

In this embodiment of the present invention, if the terminal determines the second time-frequency resource based on the second indication information, when the time domain position of the control resource set and the time domain position of the second time-frequency resource are discontinuous, that is, when a time-frequency resource at a time domain position between the time domain position of the second time-frequency resource and the time domain position of the control resource set is used by another device to receive data, the first time-frequency resource is divided, so that a time-frequency resource used by the terminal may be separated from the time-frequency resource used by the another device. In this way, the terminal can be prevented from receiving data sent by the network device to the another device, that is, data pollution can be prevented.

In the method described in FIG. 2, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to the another device, that is, data pollution can be prevented. In addition, time-frequency resources that are not used on the first several symbols in a scheduling time unit are fully used to transmit data, thereby improving resource utilization.

Figure 13:
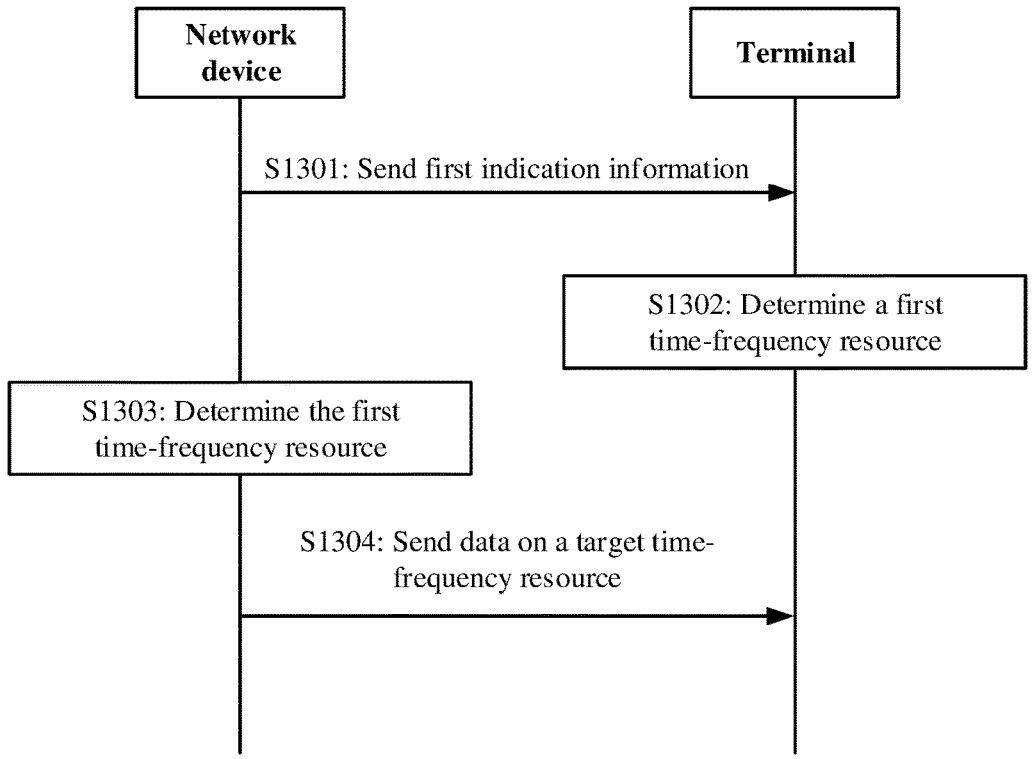
FIG. 13 is a schematic flowchart of another data receiving method according to an embodiment of the present invention.

FIG. 13 shows a data receiving method according to an embodiment of the present invention. The method may be implemented based on the communication system 10 shown in FIG. 1. The method includes but is not limited to the following steps.

Step S1301: A network device sends first indication information to a terminal.

Specifically, the first indication information is used to indicate a target frequency domain position. Optionally, the first indication information may alternatively indicate the target frequency domain position by indicating a second time-frequency resource. For example, if the first indication information indicates one time-frequency resource, a frequency domain position of the time-frequency resource is the target frequency domain position. For ease of subsequent description, the time-frequency resource indicated by the first indication information may be referred to as the second time-frequency resource. The first indication information may indicate the second time-frequency resource by carrying a frequency parameter (for example, a frequency domain start position and a frequency domain length) and a time domain parameter (for example, a time domain start position and a time domain length) of the second time-frequency resource, or may indicate the second time-frequency resource by carrying a preset identifier having a correspondence with the second time-frequency resource. The first indication information may alternatively indicate the second time-frequency resource in another manner, and the first indication information may be carried in higher layer signaling for transmission, or may be carried in downlink control information (DCI) for transmission.

In this embodiment of the present invention, the second time-frequency resource may be a time-frequency resource that is scheduled by the network device for the terminal to receive downlink data. Usually, the second time-frequency resource is not on first T symbols of a scheduling time unit (for example, a length of the scheduling time unit may be equal to one subframe, a plurality of subframes, one slot, a plurality of slots, or a plurality of symbols). Usually, the scheduling time unit is a time length in which the network device sends scheduling information once, because usually resources on first several symbols may carry control information. T is a positive integer. For example, similar to DCI in a current technology, the DCI indicates a time-frequency resource used by a terminal to receive data. For example, the DCI may indicate a segment of time-frequency resource by indicating a time domain start position and a time domain length and a frequency domain start position and a frequency domain length of a data part. The second time-frequency resource in this embodiment of the present invention may be the segment of time-frequency resource.

Correspondingly, the terminal receives the first indication information.

Specifically, after receiving the first indication information, the terminal obtains content of the first indication information through parsing, to determine the target frequency domain position. For example, the first indication information indicates the second time-frequency resource, and the first indication information includes the time domain parameter and the frequency parameter of the second time-frequency resource. Therefore, the terminal may determine the target frequency domain position based on the frequency parameter of the second time-frequency resource. For another example, the first indication information includes a time-frequency resource identifier having a correspondence with the second time-frequency resource, and the terminal may determine the second time-frequency resource based on the time-frequency resource identifier, to determine that a frequency domain position of the second time-frequency resource is the target frequency domain position.

Step S1302: The terminal determines a first time-frequency resource based on a time domain position of a control resource set and the target frequency domain position.

Specifically, a frequency domain position of the first time-frequency resource is the same as the target frequency domain position. In addition, a time domain position of the first time-frequency resource is the same as the time domain position of the control resource set or is the same as a time domain position obtained by adding N symbols to the time domain position of the control resource set, where N is a positive integer. The control resource set may be a CORESET, and information about the control resource set may be predefined in the terminal and the network device, or may be notified by the network device to the terminal in advance by using signaling. The signaling may be higher layer signaling such as RRC signaling, or may be DCI. Therefore, the terminal learns of the time domain position of the control resource set, and therefore, herein, may determine the frequency domain position of the first time-frequency resource based on the time domain position of the control resource set. In this embodiment of the present invention, the control resource set may be one control resource set, or may be a set of a plurality of control resource sets. When the control resource set is a set of a plurality of control resource sets, a time domain start position of the control resource set is the same as a time domain start position of a first control resource set, and a time domain end position of the control resource set is the same as a time domain end position of a second control resource set, wherein the first control resource set is a control resource set with the foremost start time domain position in the plurality of control resource sets, and the second control resource set is a control resource set with the rearmost end time domain position in the plurality of control resource sets. The following lists several possible cases of the first time-frequency resource with reference to the figures. In coordinates in each figure, a horizontal axis indicates a time domain and a vertical axis indicates a frequency domain. Each figure shows the first time-frequency resource, an "unavailable" area, the second time-frequency resource, the control resource set, search space SS, and a PDCCH. The "unavailable" area is a time-frequency resource reserved for a device other than the terminal. The several cases are specifically as follows.

Figure 14:
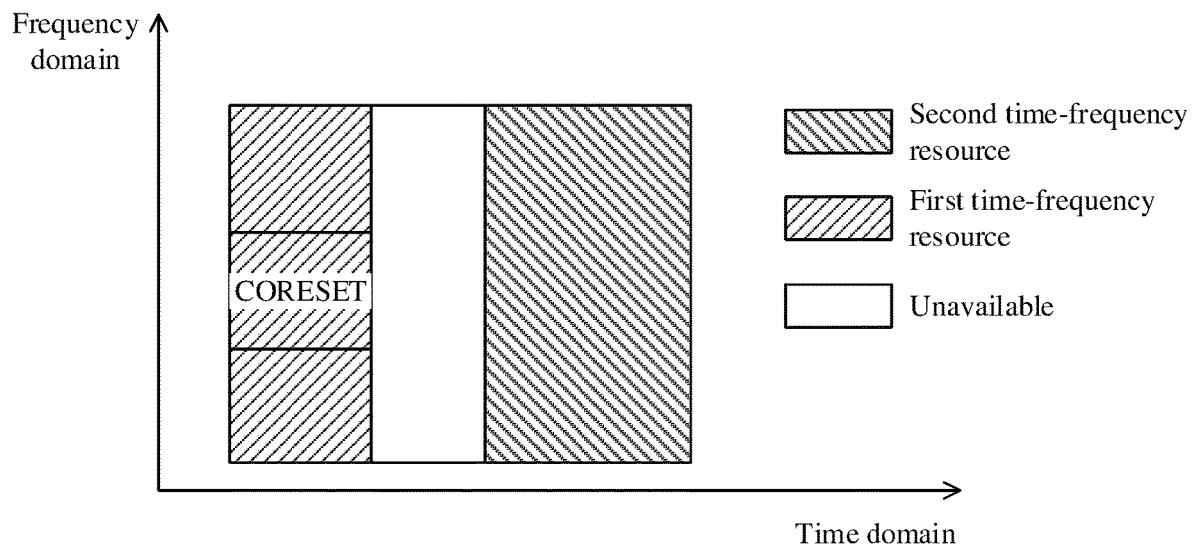
FIG. 14 is a schematic diagram of another time-frequency resource according to this embodiment of the present invention.

Case 1: The control resource set is one control resource set, and the time domain position of the first time-frequency resource is the same as a time domain position of the control resource set. If the frequency domain position of the first time-frequency resource is the same as the frequency domain position of the second time-frequency resource (namely, the target frequency domain position), the first time-frequency resource is shown in FIG. 14.

Figure 15:
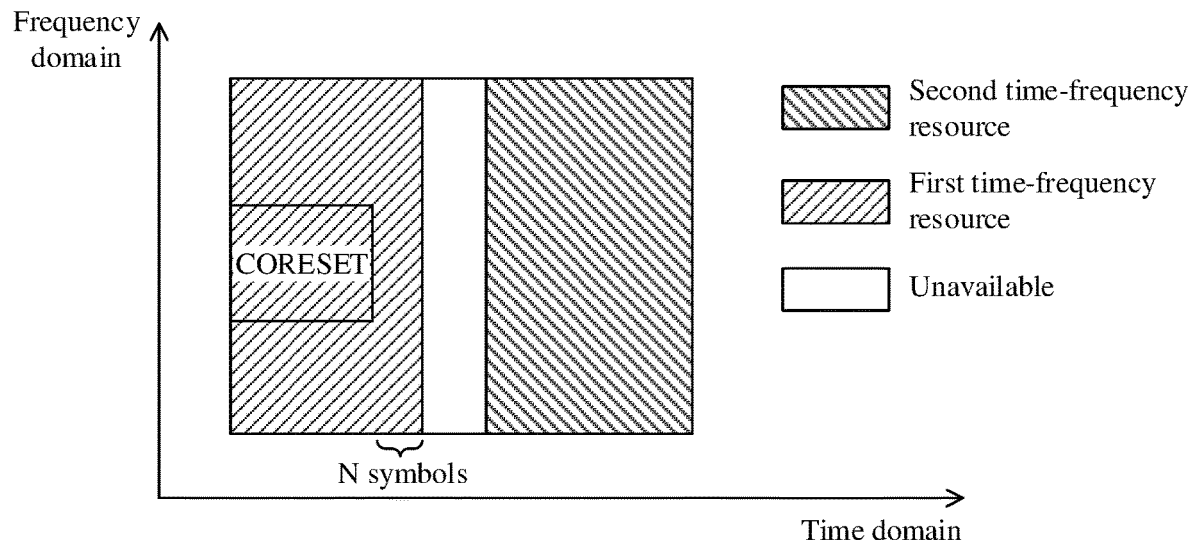
FIG. 15 is a schematic diagram of another time-frequency resource according to this embodiment of the present invention.

Case 2: The control resource set is one control resource set, and the time domain position of the first time-frequency resource is the same as a time domain position obtained by adding the N symbols to a time domain position of the control resource set, where N is a positive integer. If the frequency domain position of the first time-frequency resource is the same as the frequency domain position of the second time-frequency resource (namely, the target frequency domain position), the first time-frequency resource is shown in FIG. 15.

Figure 16:
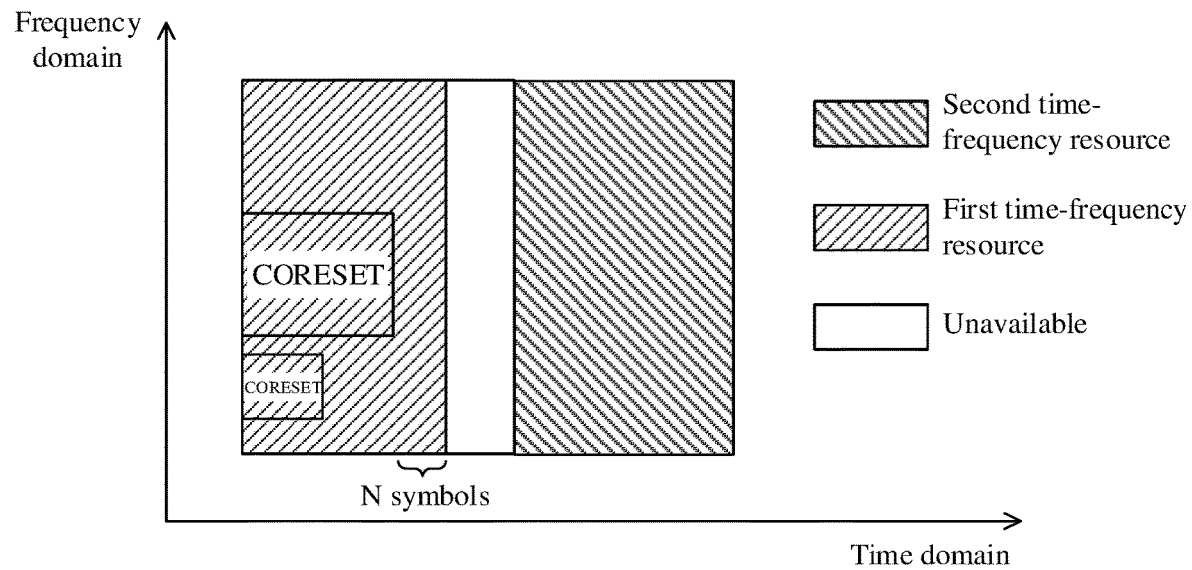
FIG. 16 is a schematic diagram of another time-frequency resource according to this embodiment of the present invention.

Case 3: The control resource set is a plurality of control resource sets. Time domain positions of the plurality of control resource sets may be in an inclusion relationship, partially overlap, or completely not overlap. Regardless of which case, it may be determined that a time domain start position of the control resource set is the same as the time domain start position of the first control resource set, and a time domain end position of the control resource set is the same as a time domain end position of the second control resource set, wherein the first control resource set is a control resource set with the foremost start time domain position in the plurality of control resource sets, and the second control resource set is a control resource set with the rearmost end time domain position in the plurality of control resource sets. If the frequency domain position of the first time-frequency resource is the same as the frequency domain position of the second time-frequency resource (namely, the target frequency domain position), the first time-frequency resource is shown in FIG. 16.

Figure 17:
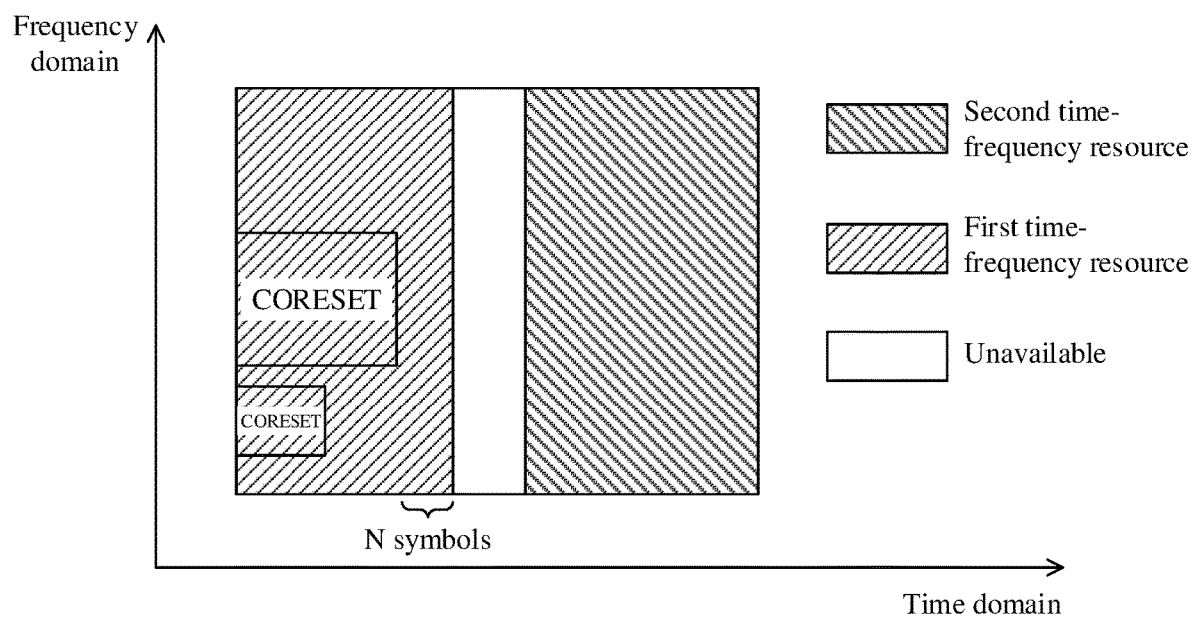
FIG. 17 is a schematic diagram of another time-frequency resource according to this embodiment of the present invention.

Case 4: The control resource set is a plurality of control resource sets. Time domain positions of the plurality of control resource sets may be in an inclusion relationship, partially overlap, or completely not overlap. Regardless of which case, it may be determined that a time domain start position of the control resource set is the same as a time start domain position of the first control resource set, and a time domain end position of the control resource set is the same as a time domain position obtained by adding the N symbols to the time domain end position of the second control resource set. If the frequency domain position of the first time-frequency resource is the same as the frequency domain position of the second time-frequency resource (namely, the target frequency domain position), the first time-frequency resource is shown in FIG. 17.

In the first optional solution, a rule is preconfigured in the terminal to specify how the terminal specifically determines the first time-frequency resource based on the time domain position of the control resource set and the target frequency domain position. Optionally, the rule specifies a relationship between the time domain position of the first time-frequency resource and the time domain position of the control resource set and/or a relationship between the frequency domain position of the first time-frequency resource and the target frequency domain position. For example, the rule specifies that the time domain position of the first time-frequency resource is the same as the time domain position of the control resource set. In this way, the terminal may determine the first time-frequency resource in the manner in Case 1 according to the rule.

In a second optional solution, before the terminal determines the first time-frequency resource, the network device sends fourth indication information to the terminal, and correspondingly, the terminal receives the fourth indication information sent by the network device. The fourth indication information may be higher layer signaling such as RRC signaling, or the fourth indication information may be DCI. The fourth indication information is used to indicate a relationship between the time domain position of the first time-frequency resource and the time domain position of the control resource set and/or a relationship between the frequency domain position of the first time-frequency resource and the target frequency domain position. For example, the fourth indication information indicates that the time domain position of the first time-frequency resource is the same as the time domain position obtained by adding the N symbols to the time domain position of the control resource set. For another example, the fourth indication information indicates that the time domain position of the first time-frequency resource is the same as the time domain position of the control resource set. In this way, the terminal may determine the second time-frequency domain resource in the manner in Case 2 according to the indication of the fourth indication information. Optionally, the fourth indication information and the first indication information may be carried in a same piece of indication information, and/or the fourth indication information and the third indication information may be carried in a same piece of indication information.

The first time-frequency resource is described above, and a target time-frequency resource is described below. The target time-frequency resource includes the second time-frequency resource and a part of resources in the first time-frequency resource; or the target time-frequency resource includes the second time-frequency resource but does not include the first time-frequency resource. The second time-frequency resource may be a time-frequency resource scheduled by the network device for the terminal, for example, a time-frequency resource scheduled by the network device for the terminal by using second indication information.

Figure 18:
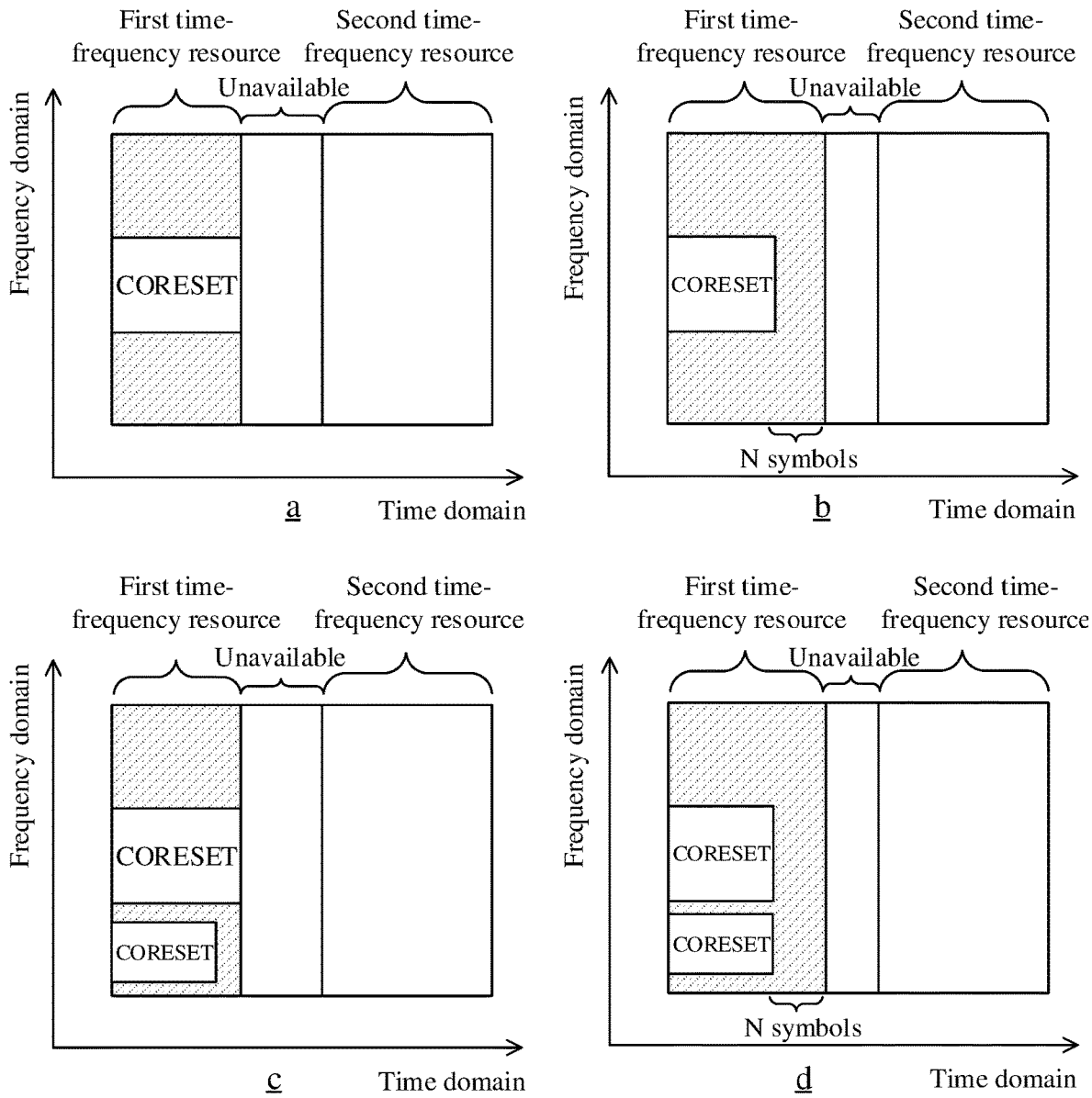
FIG. 18 is a schematic diagram of another time-frequency resource according to this embodiment of the present invention.

When the target time-frequency resource includes the second time-frequency resource and the part of resources in the first time-frequency resource, there are the following several possible solutions for the part of resources in the first time-frequency resource:

In a first solution, the part of resources in the first time-frequency resource include a time-frequency resource in the first time-frequency resource other than an area overlapping the control resource set. The control resource set may be in the first time-frequency resource, or may be outside the first time domain resource, and may further partially overlap the first time-frequency resource. When the control resource set is in the first time-frequency resource, "the area overlapping the control resource set" is all of an area occupied by the control resource set. When the control resource set is outside the first time domain resource, "the area overlapping the control resource set" does not exist. In this case, "the time-frequency resource in the first time-frequency resource other than the area overlapping the control resource set" is the first time-frequency resource. An example in which the control resource set is in the first time-frequency resource is used below to describe the part of resources in the first time-frequency resource. Referring to FIG. 18, when the time domain position of the first time-frequency resource meets "Case 1", the part of resources in the first time-frequency resource are shown in a part a in FIG. 18. When the time domain position of the first time-frequency resource meets "Case 2", the part of resources in the first time-frequency resource are shown in a part b in FIG. 18. When the time domain position of the first time-frequency resource meets "Case 3", the part of resources in the first time-frequency resource are shown in a part c in FIG. 18. When the time domain position of the first time-frequency resource meets "Case 4", the part of resources in the first time-frequency resource are shown in a part d in FIG. 18. A grid part in FIG. 18 is the part of resources in the first time-frequency resource. Optionally, the network device may avoid, as much as possible, transmitting a control resource set of another device on the part of resources in the first time-frequency resource. However, this brings a particular limitation to scheduling performed by the network device. To reduce such a limitation, optionally, the network device may notify the terminal of a time-frequency resource position of the control resource set of the another device by using signaling. In this case, the part of resources in the first time-frequency resource include neither a control resource set of the terminal nor the control resource set of the another device. In other words, "the area overlapping the control resource set" includes both an area overlapping the control resource set of the terminal and an area overlapping the control resource set of the another device, that is, includes an area overlapping all known control resource sets of the terminal.

Figure 19:
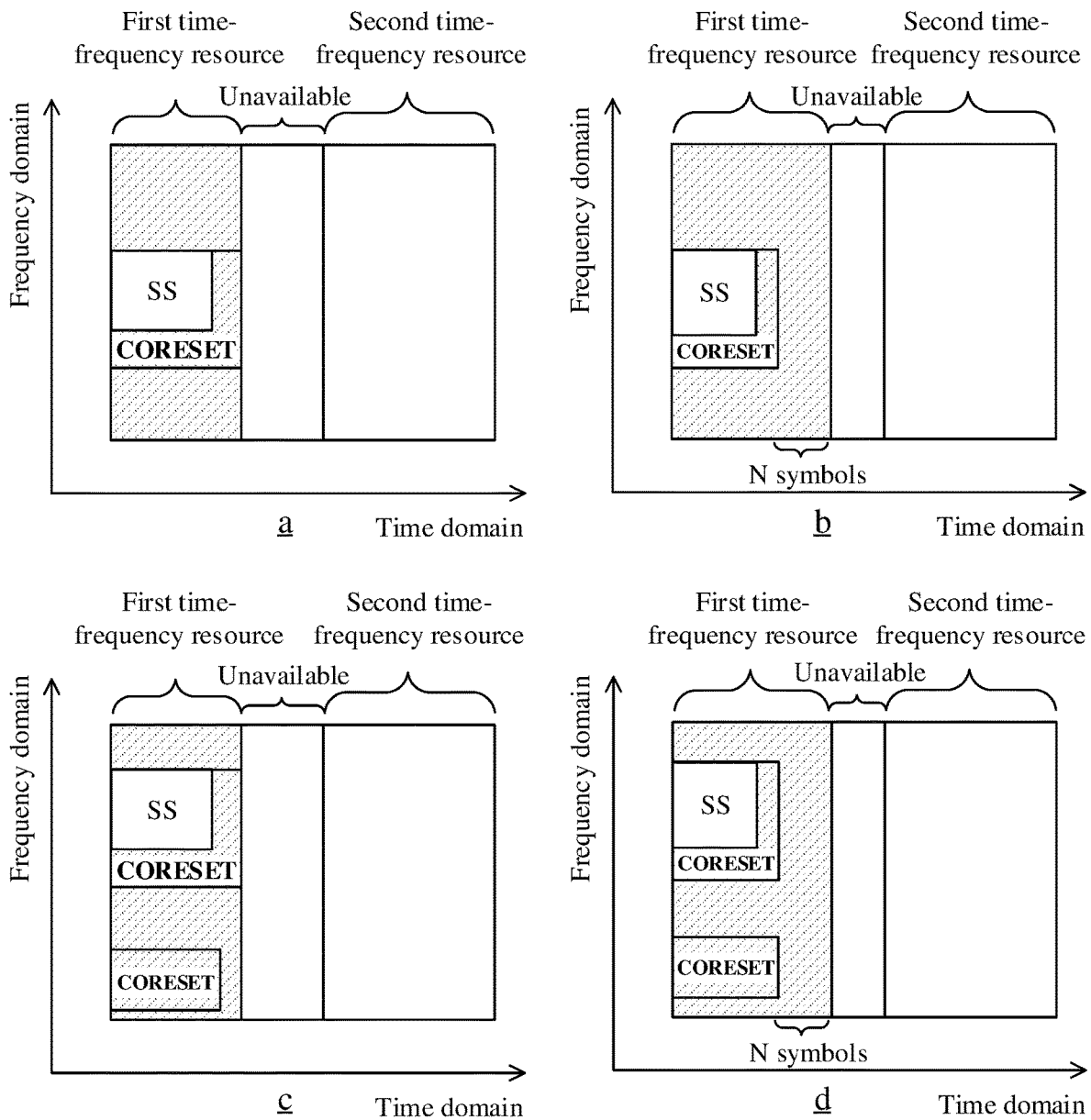
FIG. 19 is a schematic diagram of another time-frequency resource according to this embodiment of the present invention.

In a second solution, the part of resources in the first time-frequency resource include a time-frequency resource in the first time-frequency resource other than an area overlapping search space. The search space may be in the first time-frequency resource, or may be outside the first time domain resource, and may further partially overlap the first time-frequency resource. When the search space is in the first time-frequency resource, "the area overlapping the search space" is all of an area occupied by the search space. When the search space is outside the first time domain resource, "the area overlapping the search space" does not exist. In this case, "the time-frequency resource in the first time-frequency resource other than the area overlapping the search space" is the first time-frequency resource. An example in which the search space is in the first time-frequency resource is used below to describe the part of resources in the first time-frequency resource. Referring to FIG. 19, when the time domain position of the first time-frequency resource meets "Case 1", the part of resources in the first time-frequency resource are shown in a part a in FIG. 19. When the time domain position of the first time-frequency resource meets "Case 2", the part of resources in the first time-frequency resource are shown in a part b in FIG. 19. When the time domain position of the first time-frequency resource meets "Case 3", the part of resources in the first time-frequency resource are shown in a part c in FIG. 19. When the time domain position of the first time-frequency resource meets "Case 4", the part of resources in the first time-frequency resource are shown in a part d in FIG. 19. A grid part in FIG. 19 is the part of resources in the first time-frequency resource. Optionally, the network device may avoid, as much as possible, mapping search space of another device to the part of resources in the first time-frequency resource. However, this brings a particular limitation to scheduling performed by the network device. To reduce such a limitation, optionally, if the network device maps the search space of another device to the part of resources in the first time-frequency resource, the network device may notify the terminal of the search space of the another device by using signaling. In this case, the part of resources in the first time-frequency resource include neither search space of the terminal nor a time-frequency resource position occupied by the search space of the another device. In other words, "the area overlapping the search space" includes both an area overlapping the search space of the terminal and an area overlapping the search space of the another device, that is, includes an area overlapping all known search space of the terminal.

In a third solution, the part of resources in the first time-frequency resource include a time-frequency resource in the first time-frequency resource other than an area overlapping a physical downlink control channel (PDCCH) already decoded by the terminal. The PDCCH already decoded by the terminal may be in the first time-frequency resource, or may be outside the first time domain resource, and may further partially overlap the first time-frequency resource. When the PDCCH already decoded by the terminal is in the first time-frequency resource, "the area overlapping the PDCCH already decoded by the terminal" is all of an area occupied by the PDCCH already decoded by the terminal. When the PDCCH already decoded by the terminal is outside the first time domain resource, "the area overlapping the PDCCH already decoded by the terminal" does not exist. In this case, "the time-frequency resource in the first time-frequency resource other than the area overlapping the PDCCH already decoded by the terminal" is the first time-frequency resource. In this embodiment of the present invention, for all the mentioned indication information such as the foregoing first indication information and third indication information, and subsequently mentioned fourth indication information and second indication information, the PDCCH already decoded by the terminal includes the indication information, provided that the indication information is carried in the DCI and is decoded.

Figure 20:
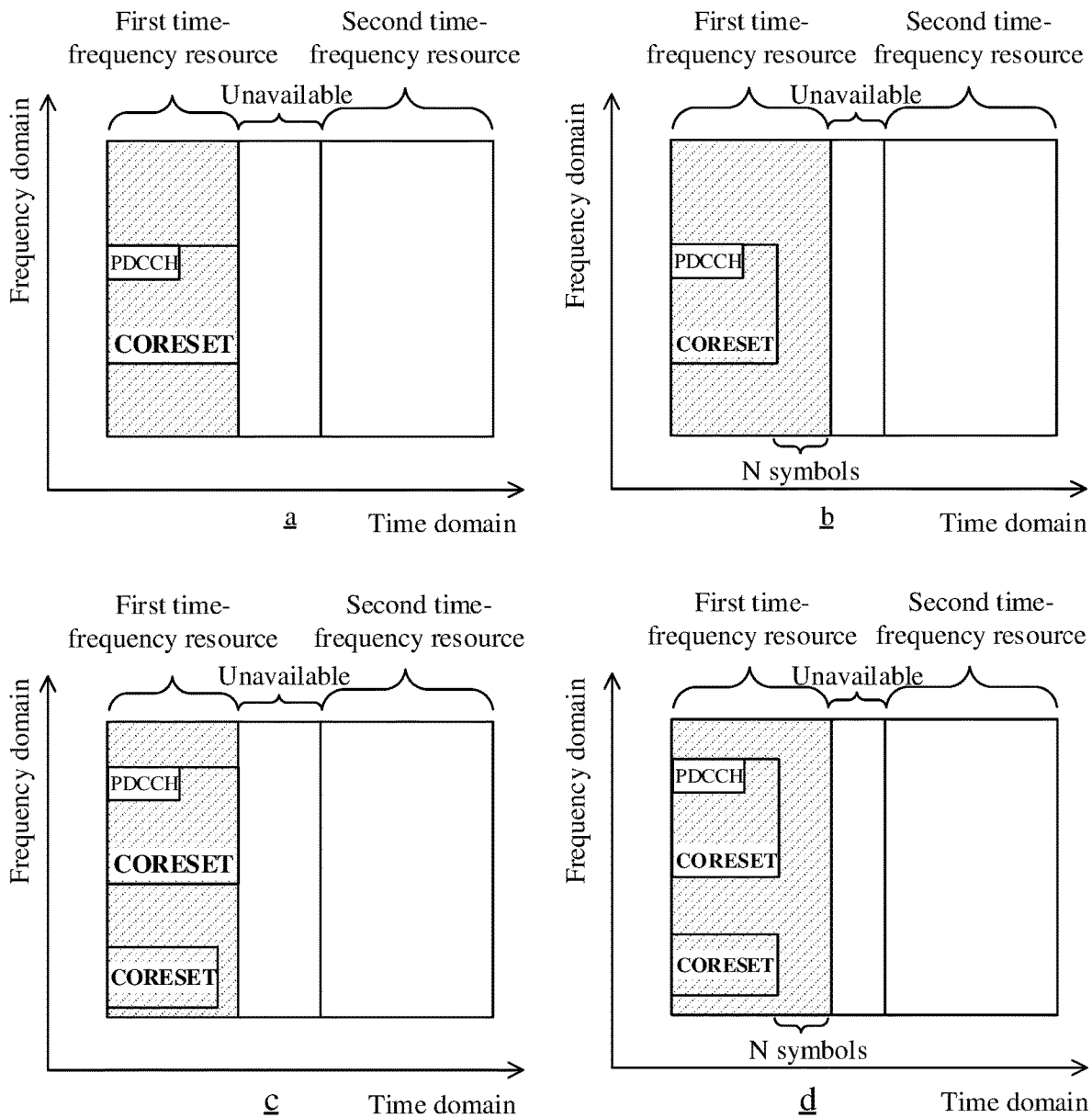
FIG. 20 is a schematic diagram of another time-frequency resource according to this embodiment of the present invention.

An example in which the PDCCH already decoded by the terminal is in the first time-frequency resource is used below to describe the part of resources in the first time-frequency resource. Referring to FIG. 20, when the time domain position of the first time-frequency resource meets "Case 1", the part of resources in the first time-frequency resource are shown in a part a in FIG. 20. When the time domain position of the first time-frequency resource meets "Case 2", the part of resources in the first time-frequency resource are shown in a part b in FIG. 20. When the time domain position of the first time-frequency resource meets "Case 3", the part of resources in the first time-frequency resource are shown in a part c in FIG. 20. When the time domain position of the first time-frequency resource meets "Case 4", the part of resources in the first time-frequency resource are shown in a part d in FIG. 20. A grid part in FIG. 20 is the part of resources in the first time-frequency resource. Optionally, the network device may avoid, as much as possible, mapping a PDCCH of another device to the part of resources in the first time-frequency resource. Optionally, if the network device maps the PDCCH of another device to the part of resources in the first time-frequency resource, the network device may notify the terminal of a time-frequency resource position of the PDCCH of the another device by using signaling.

Figure 21:
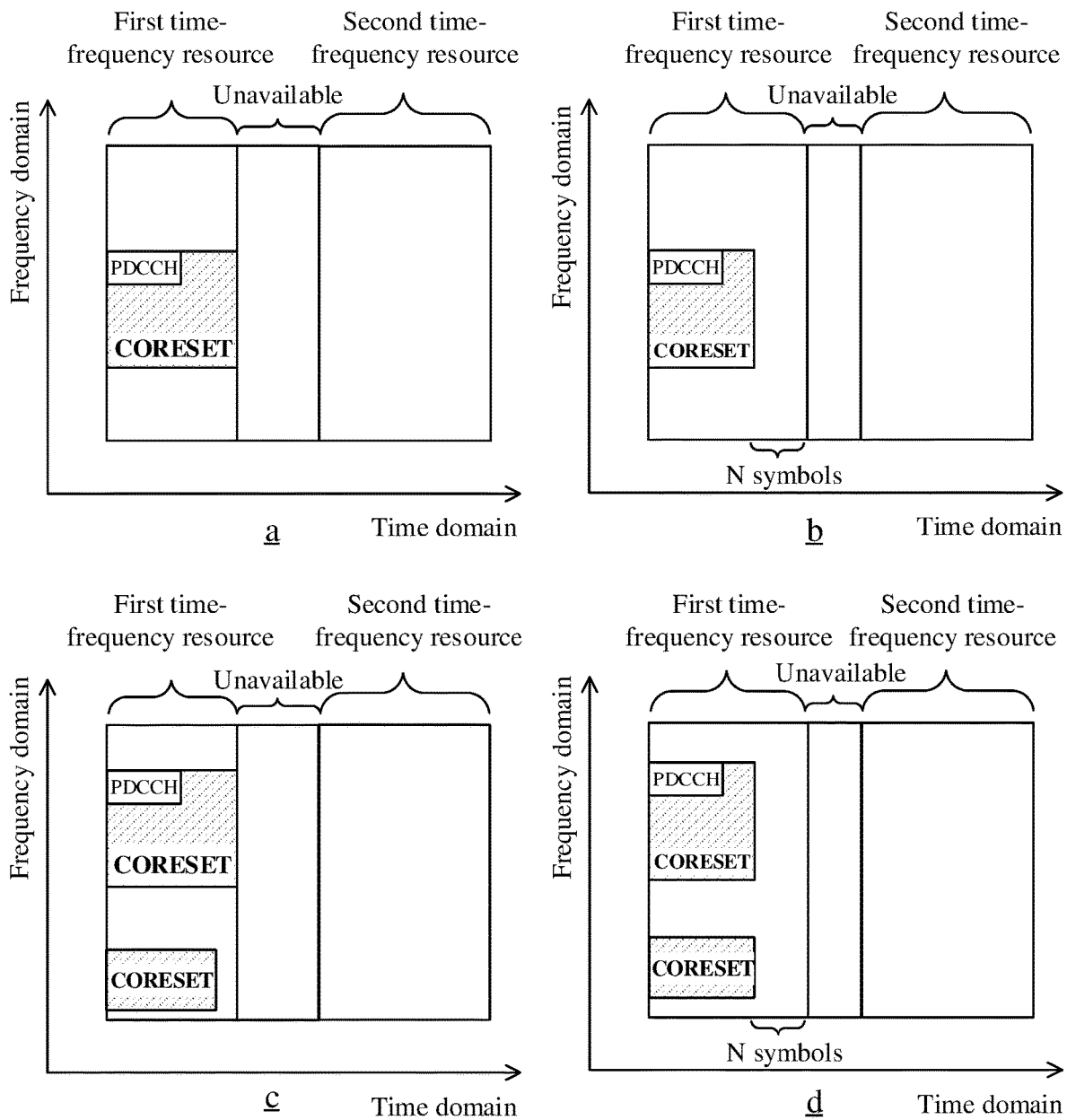
FIG. 21 is a schematic diagram of another time-frequency resource according to this embodiment of the present invention.

In a fourth solution, the part of resources in the first time-frequency resource include a time-frequency resource in an area of the control resource set other than a PDCCH already decoded by the terminal. The control resource set may be in the first time-frequency resource, or may be outside the first time domain resource, and may further partially overlap the first time-frequency resource. "The time-frequency resource in the area of the control resource set other than the PDCCH already decoded by the terminal" is a remaining time-frequency resource, in an area in which the first time-frequency resource overlaps the control resource set, other than the PDCCH already decoded by the terminal. An example in which the control resource set is in the first time-frequency resource is used below to describe the part of resources in the first time-frequency resource. Referring to FIG. 21, when the time domain position of the first time-frequency resource meets "Case 1", the part of resources in the first time-frequency resource are shown in a part a in FIG. 21. When the time domain position of the first time-frequency resource meets "Case 2", the part of resources in the first time-frequency resource are shown in a part b in FIG. 21. When the time domain position of the first time-frequency resource meets "Case 3", the part of resources in the first time-frequency resource are shown in a part c in FIG. 21. When the time domain position of the first time-frequency resource meets "Case 4", the part of resources in the first time-frequency resource are shown in a part d in FIG. 21. A grid part in FIG. 21 is the part of resources in the first time-frequency resource. Optionally, the network device needs to avoid, as much as possible, mapping a PDCCH of another device to the control resource set. Optionally, if the network device maps the PDCCH of another device to the part of resources in the first time-frequency resource, the network device may notify the terminal of a time-frequency resource position of the PDCCH of the another device by using signaling.

Figure 22:
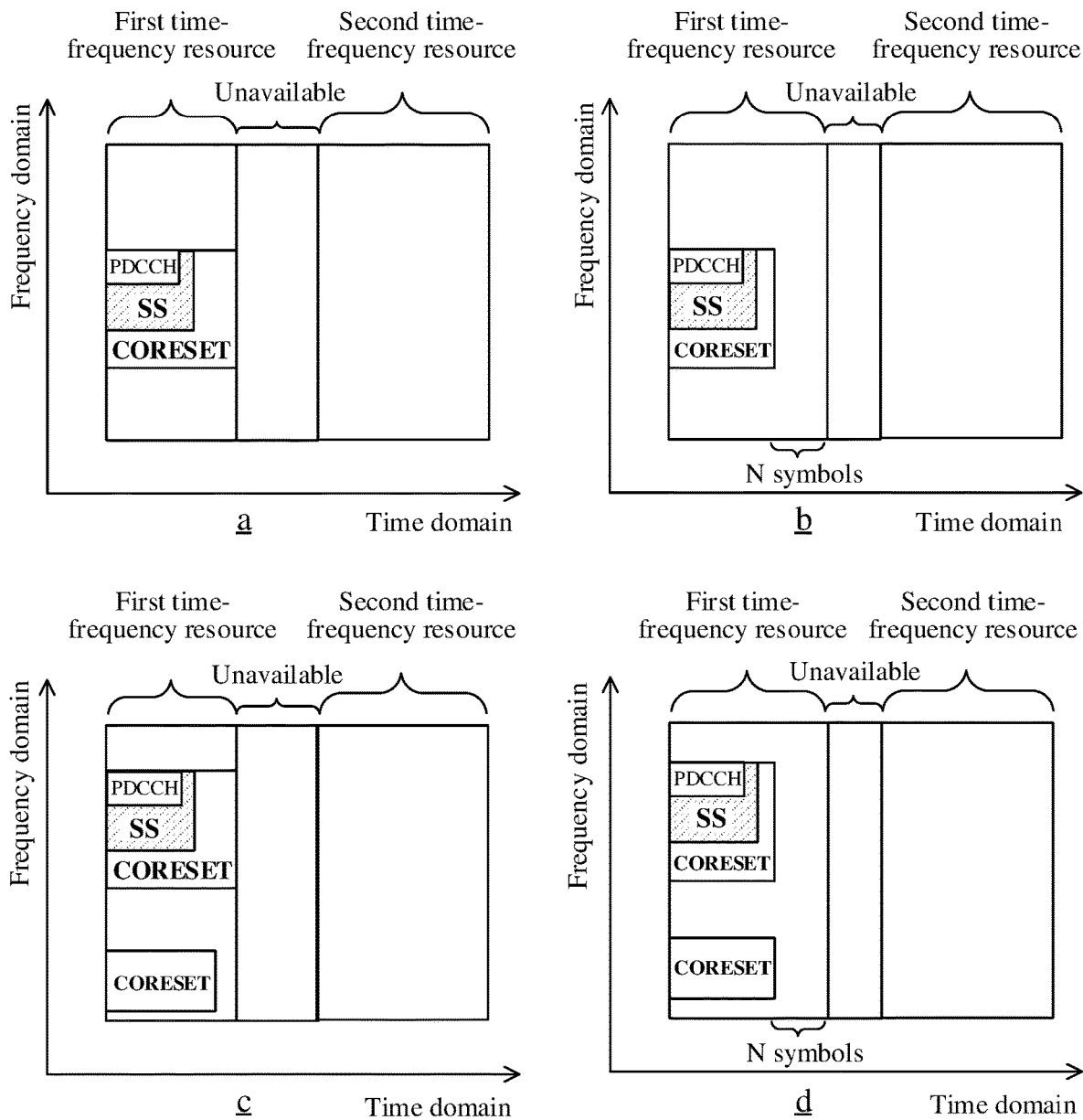
FIG. 22 is a schematic diagram of another time-frequency resource according to this embodiment of the present invention.

In a fifth solution, the part of resources in the first time-frequency resource include a time-frequency resource in an area of the search space other than a PDCCH already decoded by the terminal. The search space may be in the first time-frequency resource, or may be outside the first time domain resource, and may partially overlap the first time-frequency resource. "The time-frequency resource in the area of the search space other than the PDCCH already decoded by the terminal" is a remaining time-frequency resource, in an area in which the first time-frequency resource overlaps the search space, other than the PDCCH already decoded by the terminal. An example in which the search space is in the first time-frequency resource is used below to describe the part of resources in the first time-frequency resource. Referring to FIG. 11, when the time domain position of the first time-frequency resource meets "Case 1", the part of resources in the first time-frequency resource are shown in a part a in FIG. 22. When the time domain position of the first time-frequency resource meets "Case 2", the part of resources in the first time-frequency resource are shown in a part b in FIG. 22. When the time domain position of the first time-frequency resource meets "Case 3", the part of resources in the first time-frequency resource are shown in a part c in FIG. 22. When the time domain position of the first time-frequency resource meets "Case 4", the part of resources in the first time-frequency resource are shown in a part d in FIG. 22. A grid part in FIG. 22 is the part of resources in the first time-frequency resource. Optionally, the network device needs to avoid, as much as possible, mapping a PDCCH of another device to the search space. Optionally, if the network device maps the PDCCH of another device to the part of resources in the first time-frequency resource, the network device may notify the terminal of a time-frequency resource position of the PDCCH of the another device by using signaling.

Figure 23:
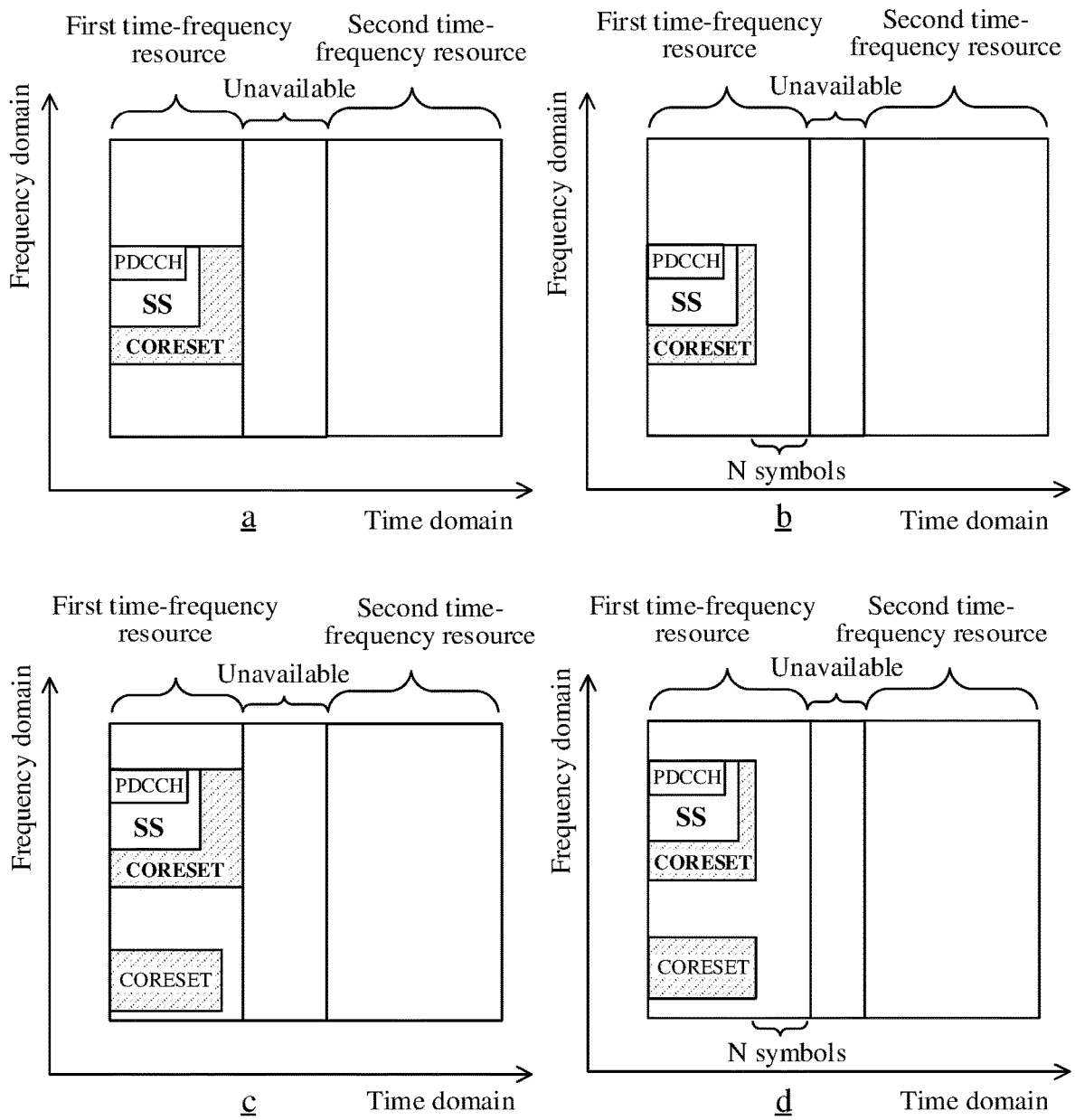
FIG. 23 is a schematic diagram of another time-frequency resource according to this embodiment of the present invention.

In a sixth solution, the part of resources in the first time-frequency resource include a time-frequency resource in the control resource set other than the search space. The control resource set may be in the first time-frequency resource, or may be outside the first time domain resource, and may further partially overlap the first time-frequency resource. "The time-frequency resource in the control resource set other than the search space" is a remaining time-frequency resource, in an area in which the first time-frequency resource overlaps the control resource set, other than the search space. An example in which the control resource set is in the first time-frequency resource is used below to describe the part of resources in the first time-frequency resource. Referring to FIG. 23, when the time domain position of the first time-frequency resource meets "Case 1", the part of resources in the first time-frequency resource are shown in a part a in FIG. 23. When the time domain position of the first time-frequency resource meets "Case 2", the part of resources in the first time-frequency resource are shown in a part b in FIG. 23. When the time domain position of the first time-frequency resource meets "Case 3", the part of resources in the first time-frequency resource are shown in a part c in FIG. 23. When the time domain position of the first time-frequency resource meets "Case 4", the part of resources in the first time-frequency resource are shown in a part d in FIG. 23. A grid part in FIG. 23 is the part of resources in the first time-frequency resource. Optionally, the network device needs to avoid, as much as possible, mapping search space of another device to the search space. Optionally, if the network device maps the search space of the another device to the part of resources in the first time-frequency resource, the network device may notify the terminal of a time-frequency resource position of the search space of the another device by using signaling.

In this embodiment of the present invention, one or more solutions to be used may be preconfigured in the terminal and the network device to determine the part of resources in the first time-frequency resource. In this way, the terminal may directly determine the part of resources in the first time-frequency resource based on the configuration. For example, if the configuration of the terminal is to determine the part of resources in the first time-frequency resource by using the "second" solution, the terminal determines the part of resources in the first time-frequency resource by using the "second" solution. In addition, the network device may send a first message to the terminal, and the terminal receives the first message sent by the network device, where the first message includes third indication information, and a first status of the third indication information indicates the part of resources in the first time-frequency resource, or a second status of the third indication information indicates that the target time-frequency resource does not include the first time-frequency resource. Optionally, the third indication information indicates a solution used to determine the part of resources in the first time-frequency resource. Therefore, the terminal may determine the part of resources in the first time-frequency resource according to the solution indicated by the third indication information. The first message may be higher layer signaling such as RRC signaling, or may be DCI. Optionally, whether the first message includes the third indication information may be configuration information notified by using higher layer signaling (such as RRC signaling), or may be notified by using downlink control information (DCI), or may be bound to a DCI format. Some DCI formats are available, and some DCI formats are unavailable. There may be different configurations for different types of users. The third indication information exists for some types of users, and the third indication information does not exist for other types of users. The terminal is one type of user. For example, an indication field is configured in the third indication information, different statuses of the indication field correspond to different solutions for the part of resources in the first time-frequency resource, and one status of the indication field is used to indicate that the target time-frequency resource does not include the first time-frequency resource. For example, the indication field includes N bits, where N is a positive integer. Assuming that N=3, 001 may be used to indicate that the part of resources in the first time-frequency resource are the part of resources in the first time-frequency resource that are described in the "first" solution, 010 may be used to indicate that the part of resources in the first time-frequency resource are the part of resources in the first time-frequency resource that are described in the "second" solution, 011 may be used to indicate that the part of resources in the first time-frequency resource are the part of resources in the first time-frequency resource that are described in the "third" solution, 100 may be used to indicate that the part of resources in the first time-frequency resource are the part of resources in the first time-frequency resource that are described in the "fourth" solution, 101 may be used to indicate that the part of resources in the first time-frequency resource are the part of resources in the first time-frequency resource that are described in the "fifth" solution, 110 may be used to indicate that the part of resources in the first time-frequency resource are the part of resources in the first time-frequency resource that are described in the "sixth" solution, and 111 may be used to indicate that data is not received on the first time-frequency resource. Correspondingly, after receiving the third indication information, if obtaining, through parsing, that a value of the indication field in the third indication information is 001, the terminal determines the part of resources in the first time-frequency resource by using the "first" solution; if obtaining, through parsing, that a value of the indication field in the third indication information is 010, the terminal determines the part of resources in the first time-frequency resource by using the "second" solution; if obtaining, through parsing, that a value of the indication field in the third indication information is on, the terminal determines the part of resources in the first time-frequency resource by using the "third" solution; if obtaining, through parsing, that a value of the indication field in the third indication information is 100, the terminal determines the part of resources in the first time-frequency resource by using the "fourth" solution; if obtaining, through parsing, that a value of the indication field in the third indication information is 101, the terminal determines the part of resources in the first time-frequency resource by using the "fifth" solution; if obtaining, through parsing, that a value of the indication field in the third indication information is 110, the terminal determines the part of resources in the first time-frequency resource by using the "sixth" solution; or if obtaining, through parsing, that a value of the indication field in the third indication information is 111, the terminal learns that data is not received on the first time-frequency resource. Similarly, N may be equal to 2, and therefore only a maximum of four solutions may be indicated. For example, 00 may be used to indicate that the part of resources in the first time-frequency resource are the part of resources in the first time-frequency resource that are described in the "first" solution, 01 may be used to indicate that the part of resources in the first time-frequency resource are the part of resources in the first time-frequency resource that are described in the "second" solution, 10 may be used to indicate that the part of resources in the first time-frequency resource are the part of resources in the first time-frequency resource that are described in the "third" solution, and 11 may be used to indicate that data is not received on the first time-frequency resource. The part of resources in all first time-frequency resources that may be used to receive data may include any combination of the foregoing six solutions, or may include another similar solution. A quantity of bits in an information field in the third indication information may be determined based on a quantity of supported solutions, and one status of the information field in the third indication information may be used to indicate that data is not received on the first time-frequency resource.

If the first message received by the terminal does not include the third indication information, the terminal does not need to receive data on the first time-frequency resource. In other words, a user does not need to determine the first time-frequency resource.

Several optional solutions for the part of resources in the first time-frequency resource are described above. Optionally, when different conditions are met, solutions for determining the part of resources in the first time-frequency resource may be different. For example, if Condition 1 is met, the part of resources in the first time-frequency resource are the part of resources in the first time-frequency resource that are described in "Solution 1"; if Condition 2 is met, the part of resources in the first time-frequency resource are the part of resources in the first time-frequency resource that are described in "Solution 2"; if Condition 3 is met, the part of resources in the first time-frequency resource are the part of resources in the first time-frequency resource that are described in "Solution 3"; if Condition 4 is met, the part of resources in the first time-frequency resource are the part of resources in the first time-frequency resource that are described in "Solution 4"; or if Condition 5 is met, the part of resources in the first time-frequency resource are the part of resources in the first time-frequency resource that are described in "Solution 5". Condition 1, Condition 2, Condition 3, Condition 4, and Condition 5 are different conditions. Specific content of these conditions is not limited herein.

Step S1303: The network device determines the first time-frequency resource based on the time domain position of the control resource set and the target frequency domain position.

Specifically, a manner in which the network device determines the first time-frequency resource is the same as a manner in which the terminal determines the first time-frequency resource, and the first time-frequency resource determined by the network device and the first time-frequency resource determined by the terminal are also a same time-frequency resource. It may be understood that, the network device knows a control resource set of each device accessing the network device, and therefore the control resource set used by the terminal in step S1302 is also known by the network device. In addition, the target frequency domain position used by the terminal in step S1302 is also indicated by the network device to the terminal by using the first indication information. In other words, the network device also has information about the target frequency domain position. Therefore, the network device may determine the first time-frequency resource based on the control resource set and the target frequency domain position, and the determined first time-frequency resource is the same as the first time-frequency resource determined by the terminal. A feature of the first time-frequency resource is already described in detail in step S1302, and details are not described herein again. It may be understood that, a sequence of step S1303 and steps S1302 and S1301 is not limited herein. In implementable solutions, step S1303 is performed before S1301, after S1301 and before S1302, or after S1302.

Step S1304: The network device sends data to the terminal on the target time-frequency resource.

Specifically, the target time-frequency resource includes the second time-frequency resource and the part of resources in the first time-frequency resource; or the target time-frequency resource includes the second time-frequency resource but does not include the first time-frequency resource. The second time-frequency resource is already described in step S1301, and details are not described herein again. When the target time-frequency resource includes the second time-frequency resource and the part of resources in the first time-frequency resource, there may be a plurality of possible solutions for the part of resources in the first time-frequency resource. The plurality of possible solutions are described in detail in step S1302, and details are not described herein again. It may be understood that, a part specifically included in the target time-frequency resource is predefined in the terminal and the network device. In this way, the network device and the terminal may determine a same target time-frequency resource based on a same configuration. Alternatively, a specific part included in the target time-frequency resource may be indicated by the network device to the terminal. In this way, it can also be ensured that the network device and the terminal use a same target time-frequency resource. Optionally, "data" herein is data other than signaling (or control information).

Optionally, different parts of a same data block are mapped to the second time-frequency resource included in the target time-frequency resource and the part of resources in the first time-frequency resource. That is, data on the two parts of resources jointly forms a complete data block, and the data block may be a transport block TB, a code block group CBG, or a code block CB. Correspondingly, the terminal receives, on the target time-frequency resource, the data sent by the network device.

In this embodiment of the present invention, when the first indication information indicates the target frequency domain position by indicating the second time-frequency resource, after the terminal obtains the second time-frequency resource through parsing, different parts of a same data block are mapped to the second time-frequency resource included in the target time-frequency resource and the part of resources in the first time-frequency resource. That is, data on the two parts of resources jointly forms a complete data block, and the data block may be a transport block (TB), a code block group (CBG), or a code block (CB). Optionally, the third indication information and the first indication information are different bit fields in a same piece of indication information, for example, different bit fields in a same piece of DCI. In this way, overheads occupied by control information can be reduced.

In addition, when the time domain position of the control resource set and a time domain position of the second time-frequency resource are discontinuous, that is, when a time-frequency resource at a time domain position between the time domain position of the second time-frequency resource and the time domain position of the control resource set is used by another device to receive data, the first time-frequency resource is divided, and the terminal receives data on the target time-frequency resource in the first time-frequency resource, so that a time-frequency resource used by the terminal may be separated from the time-frequency resource used by the another device. In this way, the terminal can be prevented from receiving data sent by the network device to the another device, that is, data pollution can be prevented.

In the method described in FIG. 13, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to the another device, that is, data pollution can be prevented. In addition, time-frequency resources that are not used on the first several symbols in a scheduling time unit are fully used to transmit data, thereby improving resource utilization.

Figure 24:
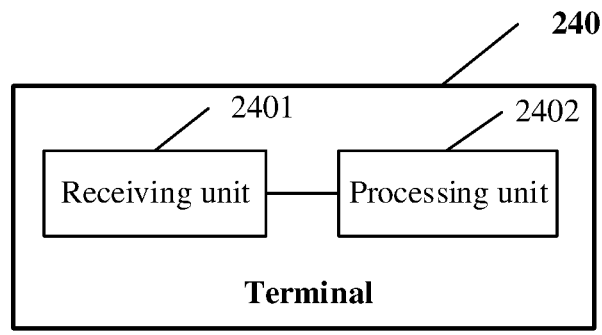
FIG. 24 is a schematic structural diagram of a terminal according to an embodiment of the present invention.

FIG. 24 is a schematic structural diagram of a terminal 240 according to an embodiment of the present invention. The terminal 240 may include a receiving unit 2401 and a processing unit 2402, and the terminal 240 may implement the foregoing method.

The receiving unit 2401 is configured to receive first indication information, where the first indication information is used to indicate a target frequency domain position. The processing unit 2402 is configured to determine a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer. The receiving unit 2401 is further configured to receive data on a target time-frequency resource, where the target time-frequency resource includes a second time-frequency resource and a part of resources in the first time-frequency resource, or the target time-frequency resource includes a second time-frequency resource but does not include the first time-frequency resource.

In an optional solution, before receiving the data on the target time-frequency resource in the first time-frequency resource, the receiving unit 2401 is further configured to receive a first message sent by a network device, where the first message includes third indication information, and a first status of the third indication information indicates the part of resources in the first time-frequency resource, or a second status of the third indication information indicates that the target time-frequency resource does not include the first time-frequency resource.

In another optional solution, before the processing unit 2402 determines the first time-frequency resource based on the time domain position of the control resource set and the target frequency domain position, the receiving unit 2401 is further configured to receive fourth indication information sent by the network device, where the terminal receives the fourth indication information sent by the network device, and the fourth indication information is used to indicate a relationship between the time domain position of the first time-frequency resource and the time domain position of the control resource set, for example, the fourth indication information is used to indicate that the time domain position of the first time-frequency resource is the same as the time domain position of the control resource set, or the fourth indication information is used to indicate that the time domain position of the first time-frequency resource is the same as the sum of the time domain position of the control resource set and the time domain positions of the N symbols.

It should be noted that, for implementation of each unit, further refer to the foregoing method embodiment, and an effect of the foregoing method embodiment can be achieved. For specific content, refer to the foregoing descriptions, and details are not described herein again.

Figure 25:
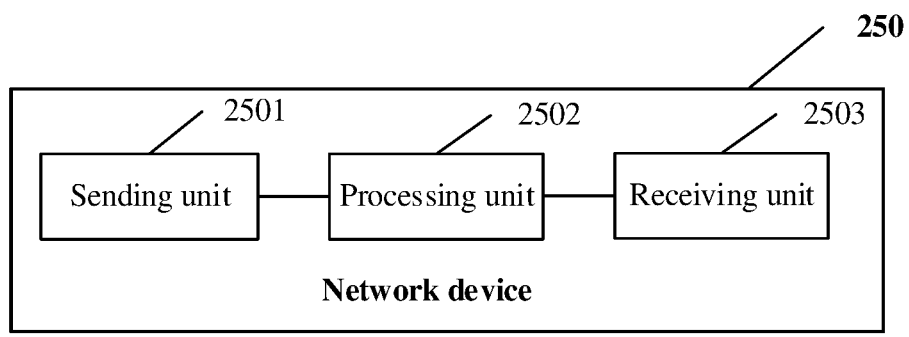
FIG. 25 is a schematic structural diagram of a network device according to an embodiment of the present invention.

FIG. 25 is a schematic structural diagram of a network device 250 according to an embodiment of the present invention. The network device 250 may include a sending unit 2501, a processing unit 2502, and a receiving unit 2503, and the network device 250 may implement the foregoing method.

The sending unit 2501 is configured to send first indication information to a terminal, where the first indication information is used to indicate a target frequency domain position. The processing unit 2502 is configured to determine a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer. The receiving unit 2503 is configured to receive data on a target time-frequency resource, where the target time-frequency resource includes a second time-frequency resource and a part of resources in the first time-frequency resource, or the target time-frequency resource includes a second time-frequency resource but does not include the first time-frequency resource.

In an optional solution, before the receiving unit 2503 receives the data on the target time-frequency resource, the sending unit 2501 is further configured to send a first message to the terminal, where the first message includes third indication information, and a first status of the third indication information indicates the part of resources in the first time-frequency resource, or a second status of the third indication information indicates that the target time-frequency resource does not include the first time-frequency resource.

In another optional solution, before the receiving unit 2503 receives the data on the target time-frequency resource, the sending unit 2501 is further configured to send fourth indication information to the terminal, where the terminal receives the fourth indication information sent by the network device, and the fourth indication information is used to indicate a relationship between the time domain position of the first time-frequency resource and the time domain position of the control resource set, for example, the fourth indication information is used to indicate that the time domain position of the first time-frequency resource is the same as the time domain position of the control resource set, or the fourth indication information is used to indicate that the time domain position of the first time-frequency resource is the same as the sum of the time domain position of the control resource set and the time domain positions of the N symbols. It may be understood that, the network device learns of a resource usage status of each accessing device. When there are a relatively large quantity of idle resources, the relationship between the time domain position of the first time-frequency resource and the time domain position of the control resource set may be indicated, so that the first time-frequency resource has a larger range. In this way, the target time-frequency resource scheduled for the terminal may have a larger range, thereby effectively improving resource utilization.

It should be noted that, for implementation of each unit, further refer to the foregoing method embodiment, and an effect of the foregoing method embodiment can be achieved.

For specific content, refer to the foregoing descriptions, and details are not described herein again.

Figure 26:
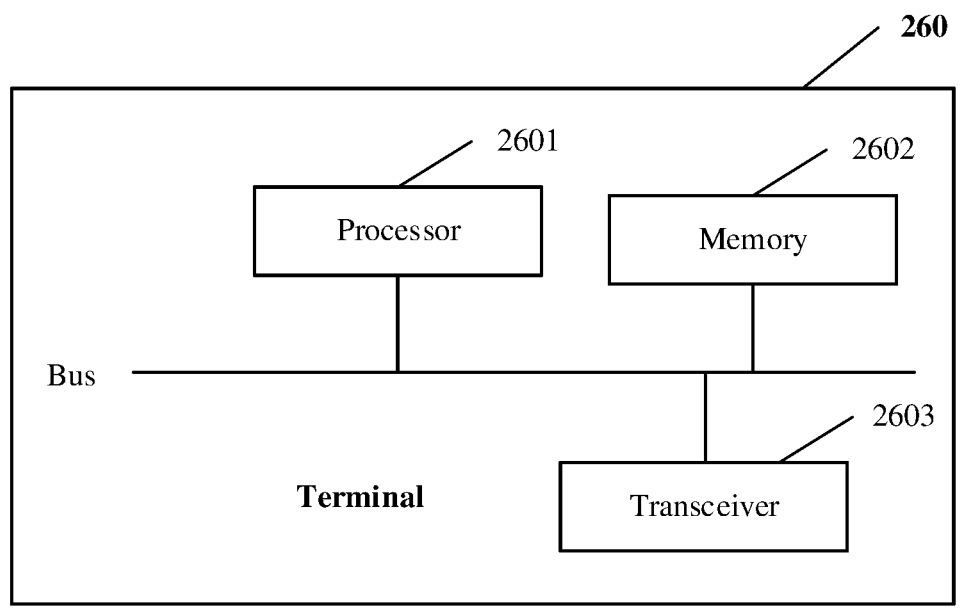
FIG. 26 is a schematic structural diagram of another terminal according to an embodiment of the present invention.

FIG. 26 shows a terminal 260 according to an embodiment of the present invention. The terminal 260 includes a processor 2601, a memory 2602, and a transceiver 2603. The processor 2601, the memory 2602, and the transceiver 2603 are connected to each other by using a bus.

The processor 2601 in the terminal 260 is configured to read program code stored in the memory 2602, to perform the following operations: receiving first indication information by using the transceiver 2603, where the first indication information is used to indicate a target frequency domain position; determining a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer; and receiving data on a target time-frequency resource by using the transceiver 2603, where the target time-frequency resource includes a second time-frequency resource and a part of resources in the first time-frequency resource, or the target time-frequency resource includes a second time-frequency resource but does not include the first time-frequency resource.

In an optional solution, before the processor 2601 receives the data on the target time-frequency resource in the first time-frequency resource by using the transceiver 2603, the processor 2601 is further configured to receive, by using the transceiver 2603, a first message sent by a network device, where the first message includes third indication information, and a first status of the third indication information indicates the part of resources in the first time-frequency resource, or a second status of the third indication information indicates that the target time-frequency resource does not include the first time-frequency resource.

In another optional solution, the first message further includes second indication information, and the second indication information is used to indicate the second time-frequency resource. In this way, resource overheads occupied by control information can be reduced. Optionally, whether the first message includes the third indication information may be indicated by using higher layer signaling (such as RRC signaling), or may be indicated by using information in downlink control information (DCI), or may be indicated by using a DCI format. The third indication information may exist for some DCI formats, and the third indication information may not exist for other DCI formats. Alternatively, there may be different configurations for different types of users. The third indication information may exist for some types of users, and the third indication information may not exist for other types of users. The terminal is one type of user.

In another optional solution, the target time-frequency resource includes the second time-frequency resource and the part of resources in the first time-frequency resource; and the part of resources in the first time-frequency resource include a time-frequency resource in the first time-frequency resource other than an area overlapping the control resource set; or the part of resources in the first time-frequency resource include a time-frequency resource in the first time-frequency resource other than an area overlapping search space; or the part of resources in the first time-frequency resource include a time-frequency resource in the first time-frequency resource other than an area overlapping a physical downlink control channel (PDCCH) already decoded by the terminal; or the part of resources in the first time-frequency resource include a time-frequency resource in the control resource set other than a PDCCH already decoded by the terminal; or the part of resources in the first time-frequency resource include a time-frequency resource in the search space other than a PDCCH already decoded by the terminal; or the part of resources in the first time-frequency resource include a time-frequency resource in the control resource set other than the search space. It may be understood that, the some specific resources in the first time-frequency resource may be preconfigured in the terminal and the network device, or may be notified to the terminal by using the first status of the third indication information included in the first message sent by the network device to the terminal. Optionally, the third indication information includes M information bits, where M is a positive integer. A first status of the M information bits corresponds to one case of the part of resources in the first time-frequency resource. A value of M is related to a quantity of cases of the part of resources in the first time-frequency resource that are supported by the terminal. Optionally, all cases of the part of resources in the first time-frequency resource that are supported by the terminal are configured by using higher layer signaling, or are preset.

In another optional solution, before the processor 2601 determines the first time-frequency resource based on the time domain position of the control resource set and the target frequency domain position, the processor 2601 is further configured to receive, by using the transceiver 2603, fourth indication information sent by the network device, where the terminal receives the fourth indication information sent by the network device, and the fourth indication information is used to indicate a relationship between the time domain position of the first time-frequency resource and the time domain position of the control resource set, for example, the fourth indication information is used to indicate that the time domain position of the first time-frequency resource is the same as the time domain position of the control resource set, or the fourth indication information is used to indicate that the time domain position of the first time-frequency resource is the same as the sum of the time domain position of the control resource set and the time domain positions of the N symbols. It may be understood that, the network device learns of a resource usage status of each accessing device. When there are a relatively large quantity of idle resources, the relationship between the time domain position of the first time-frequency resource and the time domain position of the control resource set may be indicated, so that the first time-frequency resource has a larger range. In this way, the target time-frequency resource scheduled for the terminal may have a larger range, thereby effectively improving resource utilization.

In another optional solution, the control resource set includes a plurality of control resource sets, a time domain start position of the control resource set is the same as a time domain start position of a first control resource set, and a time domain end position of the control resource set is the same as a time domain end position of a second control resource set, wherein the first control resource set is a control resource set with the foremost start time domain position in the plurality of control resource sets, and the second control resource set is a control resource set with the rearmost end time domain position in the plurality of control resource sets.

In another optional solution, the target frequency domain position is a frequency domain position of the second time-frequency resource, and the first indication information indicates the target frequency domain position by indicating the second time-frequency resource.

In another optional solution, the first time-frequency resource and the second time-frequency resource are discontinuous in time domain. It may be understood that, when the time domain position of the control resource set and a time domain position of the second time-frequency resource are discontinuous, that is, when a time-frequency resource at a time domain position between the time domain position of the second time-frequency resource and the time domain position of the control resource set is used by another device to receive data, the first time-frequency resource is divided, so that a time-frequency resource used by the terminal may be separated from the time-frequency resource used by the another device. In this way, the terminal can be prevented from receiving data sent by the network device to the another device, that is, data pollution can be prevented.

It should be noted that, for implementation of each operation, further refer to the foregoing method embodiment, and an effect of the foregoing method embodiment can be achieved. For specific content, refer to the foregoing descriptions, and details are not described herein again.

Further, an embodiment of the present invention further provides an apparatus. The apparatus may be a chip in the foregoing terminal, for example, a baseband processor. The apparatus includes a processor and a memory. The processor is configured to read program code stored in the memory, to perform operations in the foregoing method. It should be noted that, the memory in this embodiment may be a storage component in the chip. The memory 2603 included in the foregoing terminal 260 may be a memory in the processor 2601, or may be a storage chip independent of the processor 2601.

Figure 27:
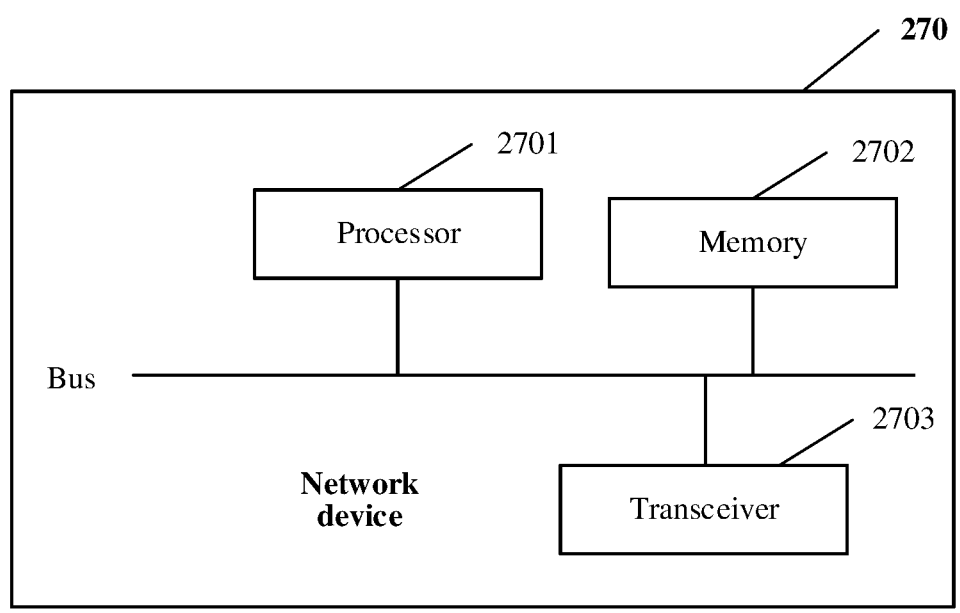
FIG. 27 is a schematic structural diagram of another network device according to an embodiment of the present invention.

FIG. 27 shows a network device 270 according to an embodiment of the present invention. The network device 270 includes a processor 2701, a memory 2702, and a transceiver 2703. The processor 2701, the memory 2702, and the transceiver 2703 are connected to each other by using a bus.

The processor 2701 in the network device 270 is configured to read program code stored in the memory 2702, to perform the following operations: sending first indication information to a terminal by using the transceiver 2703, where the first indication information is used to indicate a target frequency domain position; determining a first time-frequency resource based on a time domain position of a control resource set and the target frequency domain position, where a frequency domain position of the first time-frequency resource is the same as the target frequency domain position, and a time domain position of the first time-frequency resource is the same as the time domain position of the control resource set or a time domain position of the first time-frequency resource is the same as a sum of the time domain position of the control resource set and time domain positions of N symbols, where N is a positive integer; and receiving data on a target time-frequency resource by using the transceiver 2703, where the target time-frequency resource includes a second time-frequency resource and a part of resources in the first time-frequency resource, or the target time-frequency resource includes a second time-frequency resource but does not include the first time-frequency resource.

By performing the foregoing operations, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to the another device, that is, data pollution can be prevented. In addition, time-frequency resources that are not used on the first several symbols in a scheduling time unit are fully used to transmit data, thereby improving resource utilization.

In an optional solution, before the processor 2701 receives the data on the target time-frequency resource by using the transceiver 2703, the processor 2701 is further configured to send a first message to the terminal by using the transceiver 2703, where the first message includes third indication information, and a first status of the third indication information indicates the part of resources in the first time-frequency resource, or a second status of the third indication information indicates that the target time-frequency resource does not include the first time-frequency resource.

In another optional solution, the first message further includes second indication information, and the second indication information is used to indicate the second time-frequency resource. In this way, resource overheads occupied by control information can be reduced. Optionally, whether the first message includes the third indication information may be indicated by using higher layer signaling (such as RRC signaling), or may be indicated by using information in downlink control information (DCI), or may be indicated by using a DCI format. The third indication information may exist for some DCI formats, and the third indication information may not exist for other DCI formats. Alternatively, there may be different configurations for different types of users. The third indication information may exist for some types of users, and the third indication information may not exist for other types of users. The terminal is one type of user.

In another optional solution, the target time-frequency resource includes the second time-frequency resource and the part of resources in the first time-frequency resource; and the part of resources in the first time-frequency resource include a time-frequency resource in the first time-frequency resource other than an area overlapping the control resource set; or the part of resources in the first time-frequency resource include a time-frequency resource in the first time-frequency resource other than an area overlapping search space; or the part of resources in the first time-frequency resource include a time-frequency resource in the first time-frequency resource other than an area overlapping a physical downlink control channel (PDCCH) already decoded by the terminal; or the part of resources in the first time-frequency resource include a time-frequency resource in the control resource set other than a PDCCH already decoded by the terminal; or the part of resources in the first time-frequency resource include a time-frequency resource in the search space other than a PDCCH already decoded by the terminal; or the part of resources in the first time-frequency resource include a time-frequency resource in the control resource set other than the search space. It may be understood that, the some specific resources in the first time-frequency resource may be preconfigured, or may be notified to the terminal by using the first status of the third indication information included in the first message sent by the network device to the terminal. Optionally, the third indication information includes M information bits, where M is a positive integer. A first status of the M information bits corresponds to one case of the part of resources in the first time-frequency resource. A value of M is related to a quantity of cases of the part of resources in the first time-frequency resource that are supported by the terminal. Optionally, all cases of the part of resources in the first time-frequency resource that are supported by the terminal are configured by using higher layer signaling, or are preset.

In another optional solution, before the processor 2701 receives the data on the target time-frequency resource by using the transceiver 2703, the processor 2701 is further configured to send fourth indication information to the terminal by using the transceiver 2703, where the terminal receives the fourth indication information sent by the network device, and the fourth indication information is used to indicate a relationship between the time domain position of the first time-frequency resource and the time domain position of the control resource set, for example, the fourth indication information is used to indicate that the time domain position of the first time-frequency resource is the same as the time domain position of the control resource set, or the fourth indication information is used to indicate that the time domain position of the first time-frequency resource is the same as the sum of the time domain position of the control resource set and the time domain positions of the N symbols. It may be understood that, the network device learns of a resource usage status of each accessing device. When there are a relatively large quantity of idle resources, the relationship between the time domain position of the first time-frequency resource and the time domain position of the control resource set may be indicated, so that the first time-frequency resource has a larger range. In this way, the target time-frequency resource scheduled for the terminal may have a larger range, thereby effectively improving resource utilization.

In another optional solution, the control resource set includes a plurality of control resource sets; a time domain start position of the control resource set is the same as a time domain start position of a first control resource set; a time domain end position of the control resource set is the same as a time domain end position of a second control resource set; the first control resource set is a control resource set with the foremost start time domain position in the plurality of control resource sets; and the second control resource set is a control resource set with the rearmost end time domain position in the plurality of control resource sets.

In another optional solution, the target frequency domain position is a frequency domain position of the second time-frequency resource, and the first indication information indicates the target frequency domain position by indicating the second time-frequency resource.

In another optional solution, the first time-frequency resource and the second time-frequency resource are discontinuous in time domain. It may be understood that, when the time domain position of the control resource set and a time domain position of the second time-frequency resource are discontinuous, that is, when a time-frequency resource at a time domain position between the time domain position of the second time-frequency resource and the time domain position of the control resource set is used by another device to receive data, the first time-frequency resource is divided, so that a time-frequency resource used by the terminal may be separated from the time-frequency resource used by the another device. In this way, the terminal can be prevented from receiving data sent by the network device to the another device, that is, data pollution can be prevented.

It should be noted that, for implementation of each unit, further refer to the foregoing method embodiment, and an effect of the foregoing method embodiment can be achieved. For specific content, refer to the foregoing descriptions, and details are not described herein again.

The memory 2602 and the memory 2702 each include but are not limited to a random access memory (RAM), a read-only memory (ROM), an erasable programmable read-only memory (EPROM), or a compact disc read-only memory (CD-ROM). The memory 2602 or the memory 2702 is configured to store related instructions and related data. The transceiver 2603 and the transceiver 2703 are configured to receive and send data.

The processor 2601 and the processor 2701 each may be one or more central processing units (CPU). When the processor 2601 is one CPU, the CPU may be a single-core CPU or a multi-core CPU.

In conclusion, through implementation of the embodiments of the present invention, the network device sends the first indication information to the terminal to indicate the target frequency domain position, and the terminal determines the first time-frequency resource based on the target frequency domain position and the time domain position of the control resource set, and then determines, within a range of the first time-frequency resource, one target time-frequency resource used to transmit data. There is no intersection between the target time-frequency resource and a control channel already successfully decoded by the terminal, to avoid impact on reliability of the control channel. In addition, the first time-frequency resource may be divided, so that a time-frequency resource used by the terminal may be separated from a time-frequency resource used by another device. In this way, the terminal can be prevented from receiving data sent by the network device to the another device, that is, data pollution can be prevented. In addition, time-frequency resources that are not used on the first several symbols in a scheduling time unit are fully used to transmit data, thereby improving resource utilization.

A person of ordinary skill in the art may understand that all or some of the processes of the methods in the embodiments may be implemented by a computer program instructing related hardware. The program may be stored in a computer-readable storage medium. When the program is executed, the processes of the methods in the embodiments are performed. The foregoing storage medium includes: any medium that can store program code, such as a ROM or a random access memory RAM, a magnetic disk or an optical disc.

What is claimed is:
1. A method, comprising:
receiving, by a terminal, first indication information, wherein the first indication information indicates a target frequency domain position;
determining, by the terminal, a first time-frequency resource based on a time domain position of a control resource set and based on the target frequency domain position, wherein a frequency domain position of the first time-frequency resource is the same as the target frequency domain position, and a time domain position of the first time-frequency resource is the same as the time domain position of the control resource set; and receiving, by the terminal, data on a target time-frequency resource, wherein the target time-frequency resource comprises a second time-frequency resource and a part of resources in the first time-frequency resource, or the target time-frequency resource comprises a second time-frequency resource but does not comprise the first time-frequency resource; and wherein the first time-frequency resource and the second time-frequency resource are discontinuous in a time domain.

2. The method according to claim 1, wherein before receiving the data on the target time-frequency resource, the method further comprises:

receiving, by the terminal, a first message sent by a network device, wherein the first message comprises third indication information, and a status of the third indication information indicates that the target time-frequency resource does not comprise the first time-frequency resource.

3. The method according to claim 2, wherein the first message further comprises second indication information, and the second indication information indicates the second time-frequency resource.

4. The method according to claim 3, wherein in a case that the target time-frequency resource comprises the second time-frequency resource and the part of resources in the first time-frequency resource, the part of resources in the first time-frequency resource comprises a time-frequency resource in the first time-frequency resource, without overlapping a physical downlink control channel already decoded by the terminal.

5. The method according to claim 1, wherein before determining the first time-frequency resource based on the time domain position of the control resource set and the target frequency domain position, the method further comprises:

receiving, by the terminal, fourth indication information sent by a base station, wherein the fourth indication information indicates that the time domain position of the first time-frequency resource is the same as the time domain position of the control resource set.

6. The method according to claim 1, wherein the control resource set comprises a plurality of control resource sets, a time domain start position of the control resource set is the same as a time domain start position of a first control resource set, and a time domain end position of the control resource set is the same as a time domain end position of a second control resource set, and wherein the first control resource set is at a foremost start time domain position among the plurality of control resource sets, and the second control resource set is at a rearmost end time domain position among the plurality of control resource sets.

7. The method according to claim 1, wherein the target frequency domain position is a frequency domain position of the second time-frequency resource, and the first indication information comprises information of the second time-frequency resource to indicate the target frequency domain position.

8. An apparatus, comprising:
a non-transitory memory storage comprising instructions; and
one or more processors in communication with the memory storage, wherein the instructions, upon execution by the one or more processors, cause the apparatus to perform following:

receiving first indication information, wherein the first indication information indicates a target frequency domain position;

determining a first time-frequency resource based on a time domain position of a control resource set and based on the target frequency domain position, wherein a frequency domain position of the first time-frequency resource is the same as the target frequency domain position, and a time domain position of the first time-frequency resource is the same as the time domain position of the control resource set; and receiving data on a target time-frequency resource, wherein the target time-frequency resource comprises a second time-frequency resource and a part of resources in the first time-frequency resource, or the target time-frequency resource comprises a second time-frequency resource but does not comprise the first time-frequency resource; and wherein the first time-frequency resource and the second time-frequency resource are discontinuous in a time domain.

9. The apparatus according to claim 8, wherein the instructions are executed to further cause the apparatus to perform:

before receiving the data on the target time-frequency resource, receiving a first message sent by a network device, wherein the first message comprises third indication information, and a status of the third indication information indicates that the target time-frequency resource does not comprise the first time-frequency resource.

10. The apparatus according to claim 9, wherein the first message further comprises second indication information, and the second indication information indicates the second time-frequency resource.

11. The apparatus according to claim 10, wherein the target time-frequency resource comprises the second time-frequency resource and the part of resources in the first time-frequency resource; and wherein the part of resources in the first time-frequency resource comprises a time-frequency resource in the first time-frequency resource, without overlapping a physical downlink control channel already decoded by the apparatus.

12. The apparatus according to claim 8, wherein the instructions are executed to further cause the apparatus to perform:

before determining the first time-frequency resource based on the time domain position of the control resource set and the target frequency domain position,
receiving fourth indication information sent by a base station, wherein the fourth indication information indicates that the time domain position of the first time-frequency resource is the same as the time domain position of the control resource set.

13. The apparatus according to claim 8, wherein the control resource set comprises a plurality of control resource sets, a time domain start position of the control resource set is the same as a time domain start position of a first control resource set, and a time domain end position of the control resource set is the same as a time domain end position of a second control resource set, and wherein the first control resource set is at a foremost start time domain position among the plurality of control resource sets, and the second control resource set is at a rearmost end time domain position among the plurality of control resource sets.

14. A non-transitory computer-readable storage medium comprising instructions that, when executed by a terminal, cause the terminal to carry out steps of:
- receiving first indication information, wherein the first indication information indicates a target frequency domain position;
- determining a first time-frequency resource based on a time domain position of a control resource set and based on the target frequency domain position, wherein a frequency domain position of the first time-frequency resource is the same as the target frequency domain position, and a time domain position of the first time-frequency resource is the same as the time domain position of the control resource set; and
- receiving data on a target time-frequency resource, wherein the target time-frequency resource comprises a second time-frequency resource and a part of resources in the first time-frequency resource, or the target time-frequency resource comprises a second time-frequency resource but does not comprise the first time-frequency resource; and
- wherein the first time-frequency resource and the second time-frequency resource are discontinuous in a time domain.

15. The non-transitory computer-readable storage medium according to claim 14, wherein before receiving the data on the target time-frequency resource, the instructions, when executed by the terminal, further cause the terminal to carry out:
- receiving a first message sent by a network device, wherein the first message comprises third indication information, and a status of the third indication information indicates resource that the target time-frequency resource does not comprise the first time-frequency resource.

16. The non-transitory computer-readable storage medium according to claim 15, wherein the first message further comprises second indication information, and the second indication information indicates the second time-frequency resource.

17. The non-transitory computer-readable storage medium according to claim 16, wherein in a case that the target time-frequency resource comprises the second time-frequency resource and the part of resources in the first time-frequency resource, the part of resources in the first time-frequency resource comprises a time-frequency resource in the first time-frequency resource, without overlapping a physical downlink control channel already decoded by the terminal.

18. The non-transitory computer-readable storage medium according to claim 14, wherein before determining the first time-frequency resource based on the time domain position of the control resource set and the target frequency domain position, the instructions when executed by the terminal, further cause the terminal to carry out a step of:
- receiving fourth indication information sent by a base station, wherein the fourth indication information indicates that the time domain position of the first time-frequency resource is the same as the time domain position of the control resource set.

19. The non-transitory computer-readable storage medium according to claim 14, wherein the control resource set comprises a plurality of control resource sets, a time domain start position of the control resource set is the same as a time domain start position of a first control resource set, and a time domain end position of the control resource set is the same as a time domain end position of a second control resource set, and wherein the first control resource set is at a foremost start time domain position among the plurality of control resource sets, and the second control resource set is at a rearmost end time domain position among the plurality of control resource sets.

* * * * *